(12) United States Patent
Carls et al.

(10) Patent No.: US 10,096,269 B2
(45) Date of Patent: Oct. 9, 2018

(54) IDENTIFICATION TAG

(71) Applicant: Corning Research & Development Corporation, Corning, NY (US)

(72) Inventors: Joseph C. Carls, Austin, TX (US); Vaughn G. Amann, Austin, TX (US); Jun Xiao, Austin, TX (US); William J. Clatanoff, Austin, TX (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 15/533,888

(22) PCT Filed: Dec. 1, 2015

(86) PCT No.: PCT/US2015/063072
§ 371 (c)(1),
(2) Date: Jun. 7, 2017

(87) PCT Pub. No.: WO2016/099851
PCT Pub. Date: Jun. 23, 2016

(65) Prior Publication Data
US 2017/0330489 A1 Nov. 16, 2017

Related U.S. Application Data

(60) Provisional application No. 62/093,853, filed on Dec. 18, 2014.

(51) Int. Cl.
*G09F 3/02* (2006.01)
*G09F 3/00* (2006.01)
(Continued)

(52) U.S. Cl.
CPC ............ *G09F 3/0297* (2013.01); *B32B 5/022* (2013.01); *B32B 7/12* (2013.01); *B32B 27/08* (2013.01);
(Continued)

(58) Field of Classification Search
CPC ... G09F 3/0297; G09F 3/10; G09F 2003/0241
See application file for complete search history.

(56) References Cited

U.S. PATENT DOCUMENTS 3,706,150 A * 12/1972 Greenberger ............. G09F 3/20
40/649
4,167,073 A * 9/1979 Tang ....................... G09F 3/204
40/584
(Continued)

FOREIGN PATENT DOCUMENTS

CN 103294980 9/2013
EP 1734494 A1 12/2006
(Continued)

OTHER PUBLICATIONS

Arii, "Optical Fiber Network Operation Technologies for Expanding Optical Access Network Services", NTT Technical Review, 2007, vol. 5, No. 2, pp. 32-38.
(Continued)

*Primary Examiner* — Gary Chapman Hoge
(74) *Attorney, Agent, or Firm* — Brad C. Rametta

(57) ABSTRACT

An identification tag is described that includes a tab portion having a unique identifier, an anchor portion, and a tether portion connecting the tab portion to the anchor portion. The anchor portion has a permanent pressure sensitive adhesive to secure the tag to one of a patch cable or a port disposed in a patch panel. In an exemplary aspect, the tag portion, anchor portion and the tether portion of the tag are formed as an integral structure. The unique identifier is a two-dimensional code, that is printed as an inverted image to provide improved network security and prevent reading of the unique identifiers by unapproved reading devices.

16 Claims, 25 Drawing Sheets

(51) Int. Cl.
*B32B 5/02* (2006.01)
*B32B 7/12* (2006.01)
*B32B 27/08* (2006.01)
*B32B 27/10* (2006.01)
*G09F 3/10* (2006.01)

(52) U.S. Cl.
CPC ............... *B32B 27/10* (2013.01); *G09F 3/10* (2013.01); *B32B 2307/416* (2013.01); *B32B 2307/748* (2013.01); *B32B 2307/75* (2013.01); *B32B 2519/00* (2013.01); *G09F 2003/0241* (2013.01)

(56) References Cited

U.S. PATENT DOCUMENTS

| | | |
|---|---|---|
| 6,412,205 B1 | 7/2002 | Cheresko |
| 6,808,116 B1 | 10/2004 | Eslambolchi et al. |
| 6,817,127 B2 * | 11/2004 | Gottlieb .................. G09F 3/04 40/584 |
| 7,193,833 B2 | 3/2007 | Wern et al. |
| 8,556,163 B2 | 10/2013 | Wu et al. |
| 8,556,522 B2 | 10/2013 | Cunningham |
| 2003/0089005 A1 | 5/2003 | Caveney |
| 2004/0123504 A1 | 7/2004 | Williams, Jr. |
| 2005/0232636 A1 | 10/2005 | Durrant et al. |
| 2007/0044354 A1 * | 3/2007 | Hiramoto .................. G09F 3/04 40/124.13 |
| 2007/0148393 A1 * | 6/2007 | Sellars .................. G09F 3/0288 428/40.1 |
| 2010/0051707 A1 | 3/2010 | Conzelmann |
| 2010/0313454 A1 | 12/2010 | Smith, Jr. et al. |
| 2011/0008996 A1 | 1/2011 | Pinn et al. |
| 2011/0283578 A1 * | 11/2011 | Engelby ................ G09F 3/0288 40/584 |
| 2012/0301084 A1 | 11/2012 | Kozischek et al. |
| 2013/0260602 A1 | 10/2013 | German et al. |
| 2014/0005608 A1 | 1/2014 | Schreiner et al. |
| 2014/0061297 A1 | 3/2014 | Smith et al. |
| 2014/0123525 A1 | 5/2014 | Payne |
| 2014/0366413 A1 * | 12/2014 | Weidauer .......... B32L 338/0004 40/638 |

FOREIGN PATENT DOCUMENTS

| | | |
|---|---|---|
| EP | 2001006 A2 | 12/2008 |
| EP | 2490204 A1 | 8/2012 |
| JP | 10232611 A | 9/1998 |
| JP | 2010224488 A | 10/2010 |
| WO | WO 2006-031185 | 3/2006 |
| WO | WO 2010-082892 | 7/2010 |
| WO | WO 2012-005646 | 1/2012 |
| WO | WO 2014-025304 | 2/2014 |
| WO | WO 2014-031417 | 2/2014 |
| WO | WO 2016-099848 | 6/2016 |
| WO | WO 2016-099849 | 6/2016 |

OTHER PUBLICATIONS

Fujikura-Future Access Catalog, Optical Termination Rack (Central Office) FTM Series, 2013, 1 page.
International Search Report for PCT International Application No. PCT/US2015/063072, dated Mar. 11, 2016, 3 pages.
EP15870641 Supplementary Search Report dated Jul. 6, 2018, Eurpean Patent Office, 8 pgs.

* cited by examiner

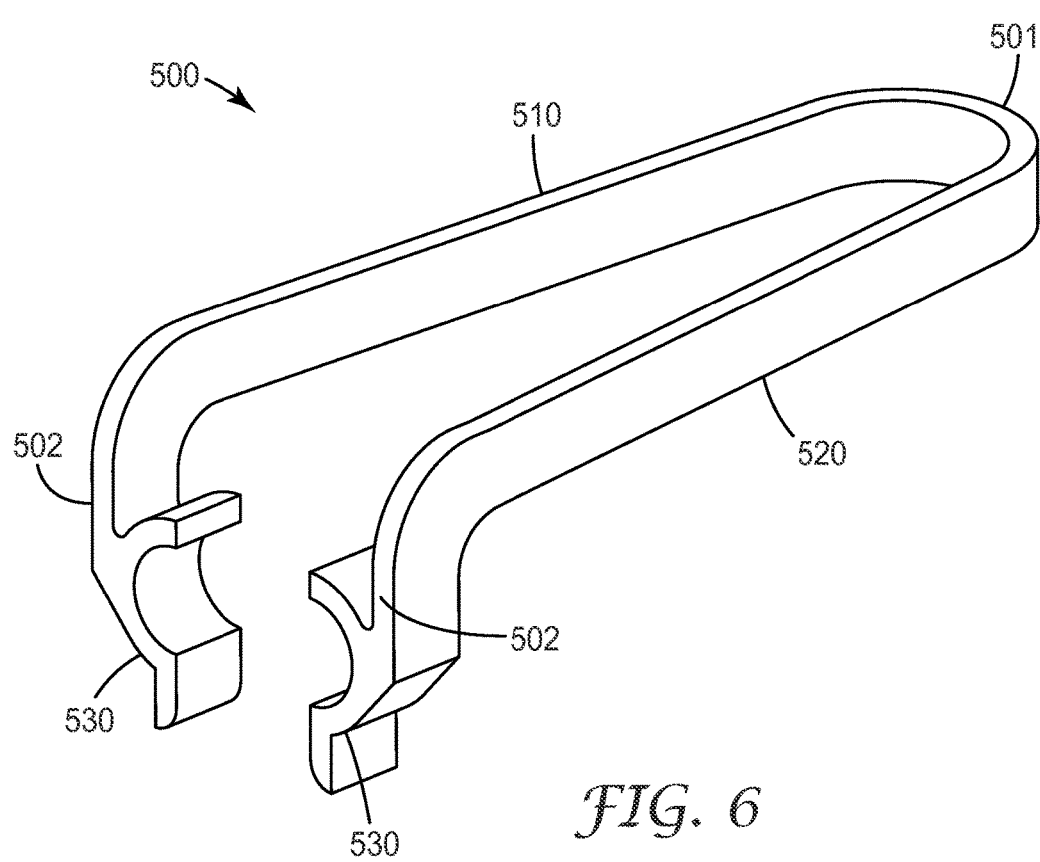

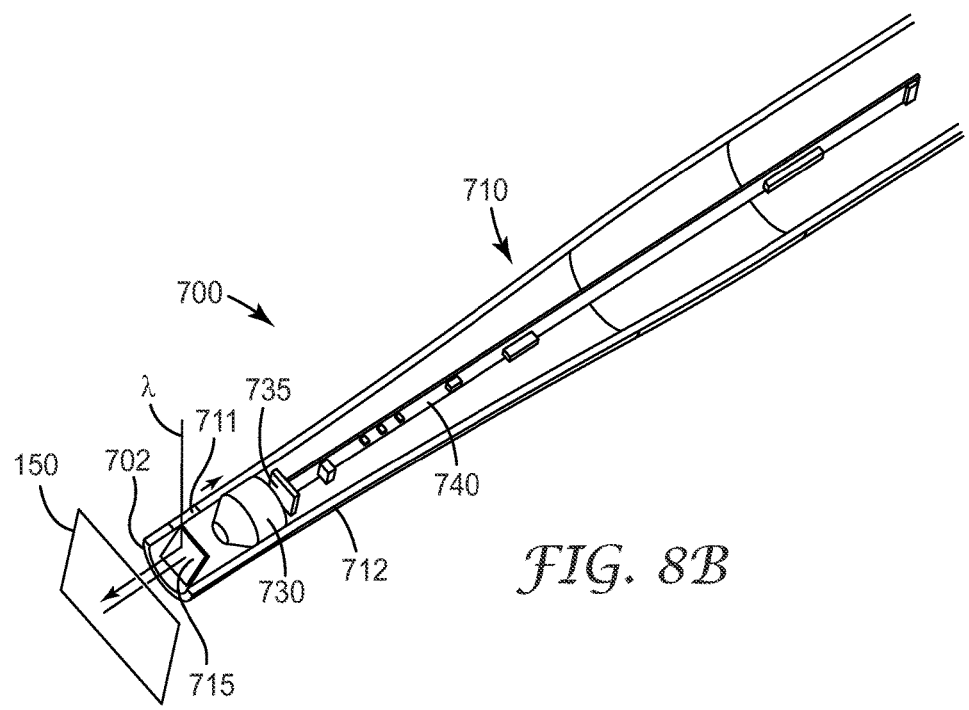
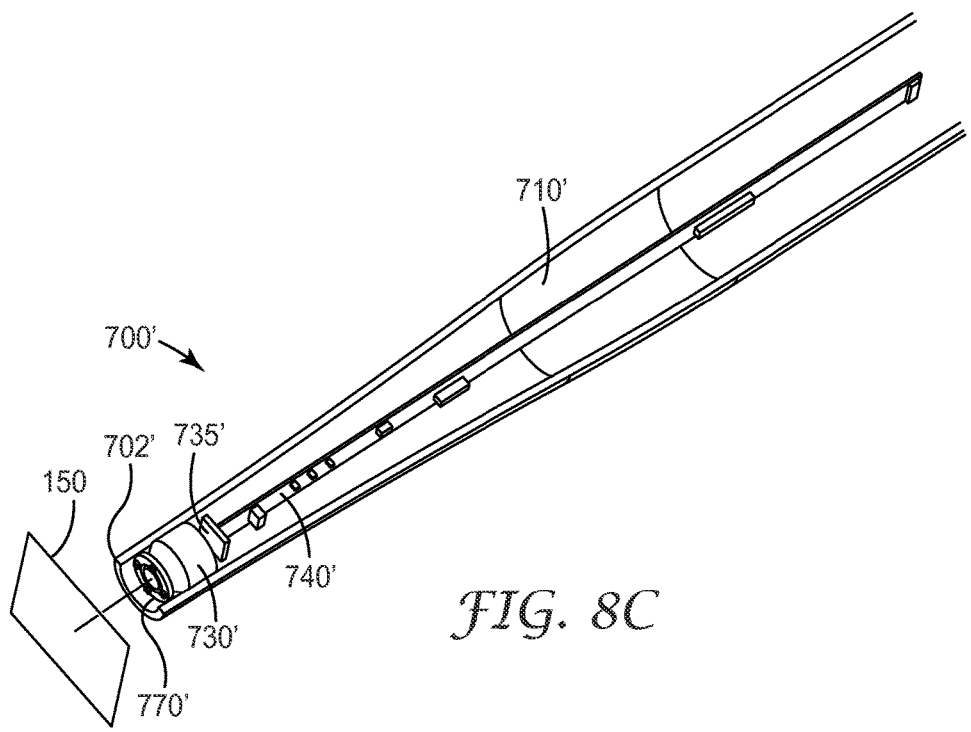

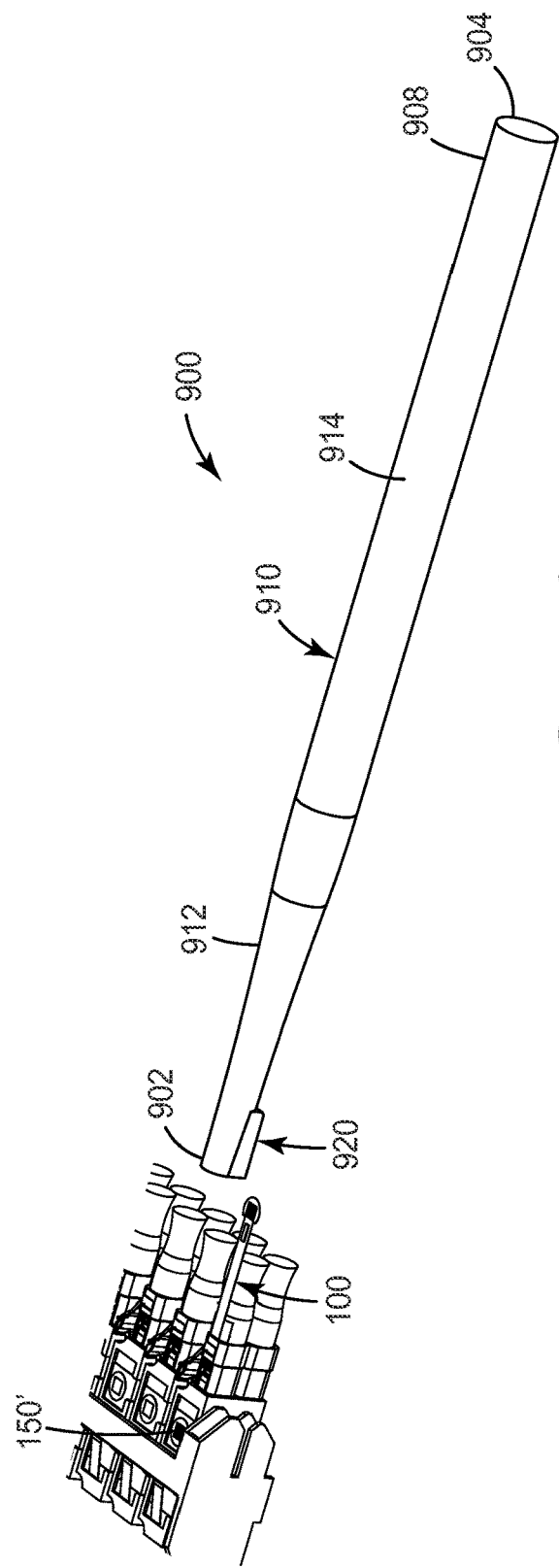

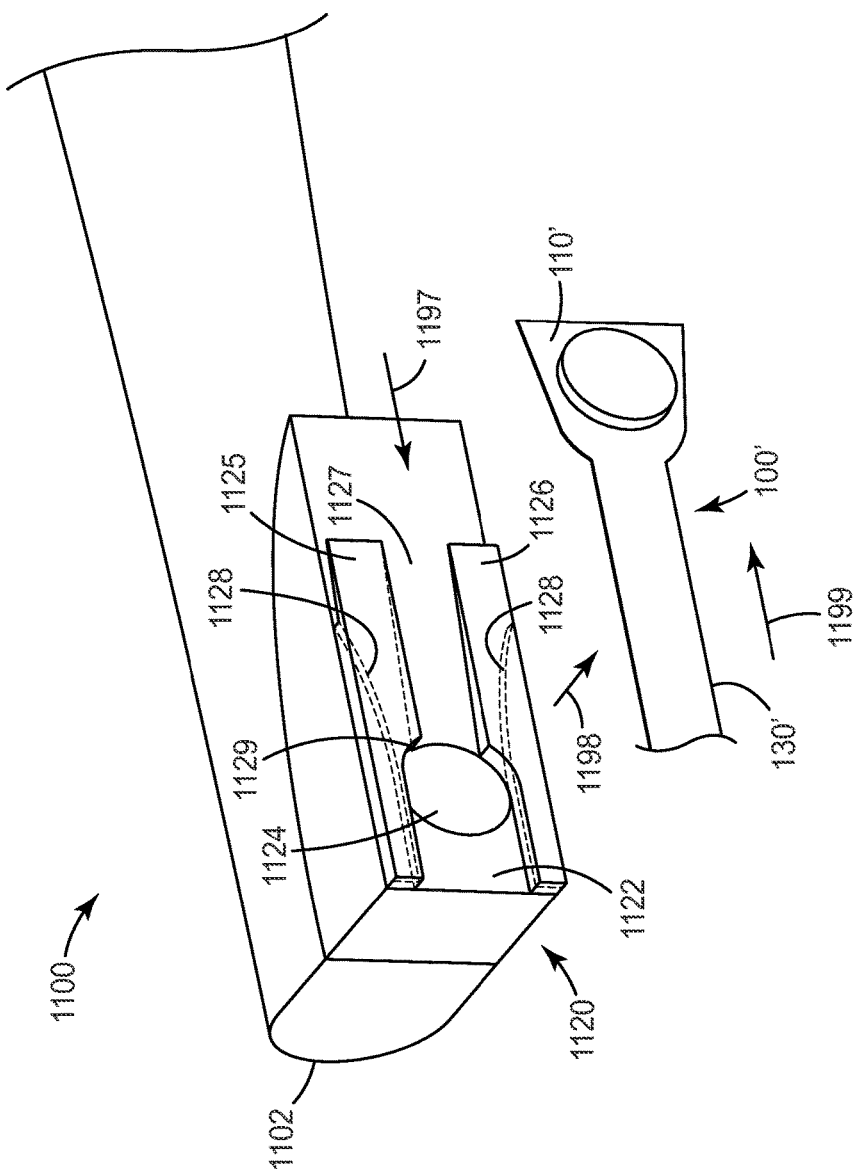

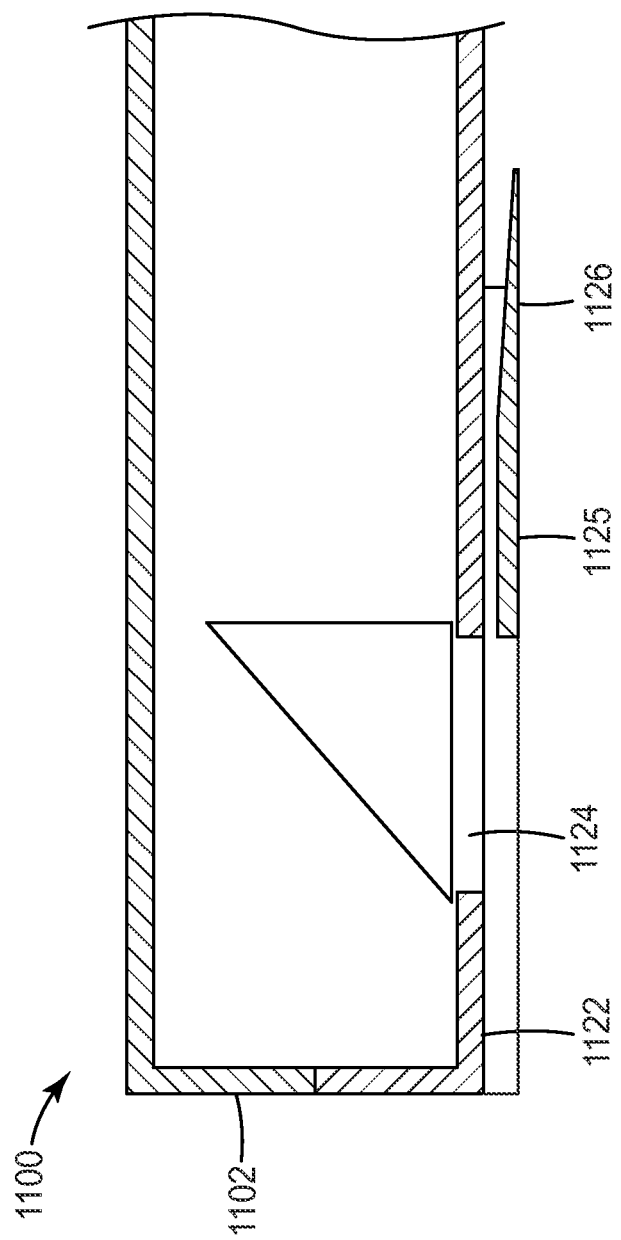

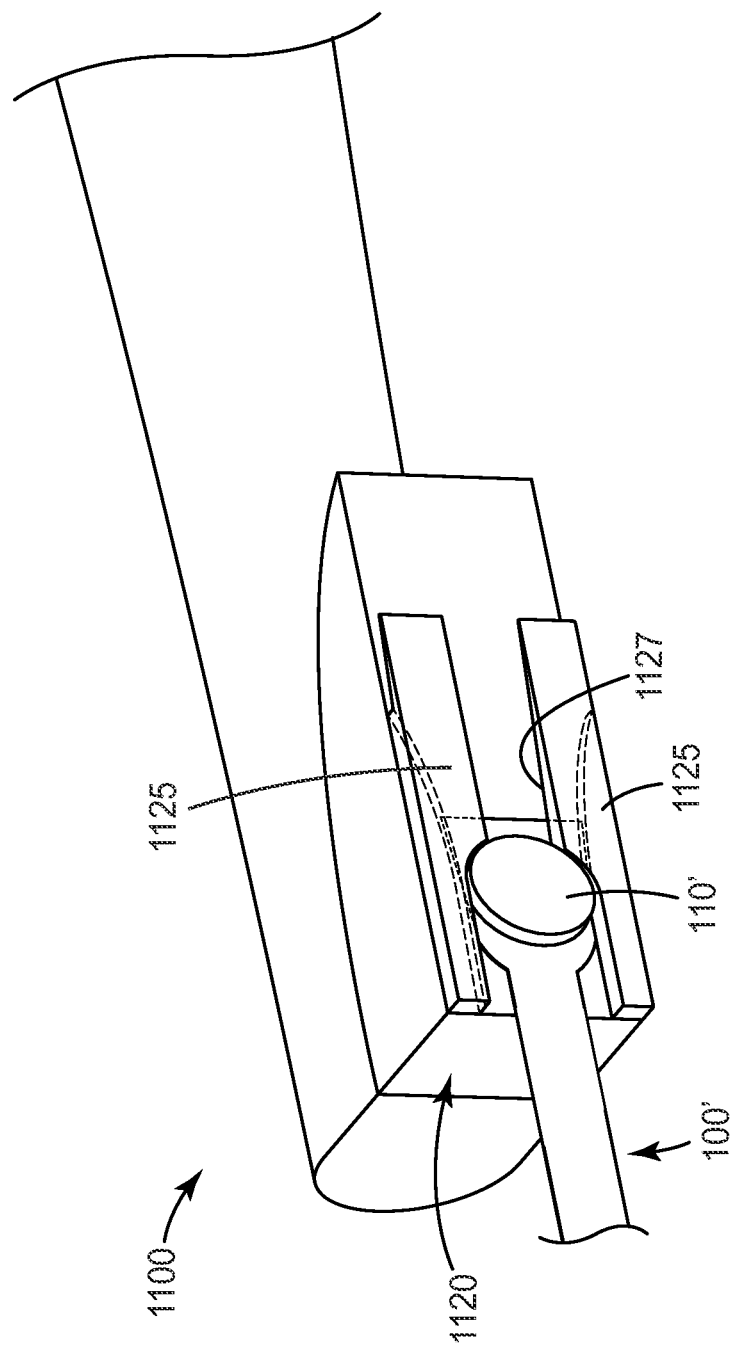

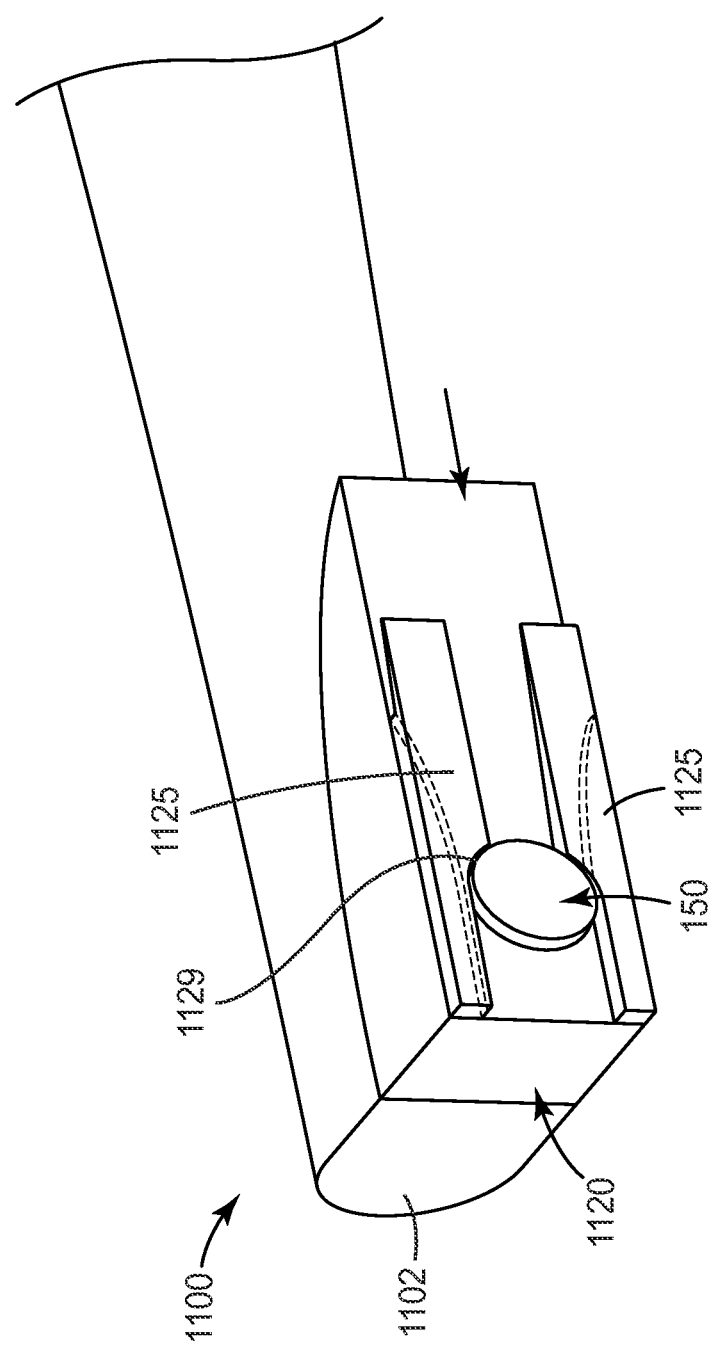

IDENTIFICATION TAG

BACKGROUND OF THE INVENTION

Field of the Invention

The present description relates to identification tags and a unique application method for applying said tags in high density applications. More specifically, the description relates to identification tags that have a two dimensional unique identifier code disposed on a portion thereof.

Background

Within modern data centers and telecommunication facilities, tens if not hundreds of thousands of electrical or fiber-optic patching connections are made. Data centers and communications installations typically have many patch bays comprising communication racks containing patch panels where pieces of communications equipment residing in other racks are interconnected. For instance, Ethernet switches are typically connected to dozens of servers located in various racks within a data center and these connections are made on either optical or copper wire based patch panels.

After initial equipment installation, data centers may move, add, and change (MAC) the location of pieces of equipment when new equipment is added or existing equipment is replaced or upgraded. These changes are referred to as MAC events. When a MAC event occurs, personnel will manually move one or more patch cords in the patch bays. Each manual movement of a patch cord carries the potential risks that the wrong patch cable will be moved or that the cable records will be modified with incorrect change information that could jeopardize both future MAC events as well as current communication. In addition, patch cables are sometimes abandoned in place for fear of disturbing other connections.

Providing positive identification of individual patch cables and interconnections can help eliminate these problems. However, the tagging of connections can be troublesome in high density connection environments such as those found in data centers and communication installations. Because of the pure magnitude of connections in these environments, properly tagging each of these connections is an immense job, especially in situations where there is an existing population of unidentified connections tagged. Current tagging approaches typically involve manually tagging a single connection with that connection's relevant information. This process is both labor-intensive and potentially subject to tagging errors.

In addition, current labels for patch cables and ports in a patch panel can be relatively large. In areas with high connection densities, the size of the tags can become cumbersome. A second problem with the current labeling concepts is that the tags are often rigidly fixed to some portion of the patch cords which can lead to issues in reading the tags after installation and can require positioning of the reader relative to the tag to conform to the tag orientation, or some portion of the patch cord must be positioned to conform to the reader orientation. When the tags are rigidly attached to the patch cords, the need to get the correct orientation between the reader and the tag ranges from being a minor impediment to causing a disruption of service in order to read the tag on the patch cord.

Thus, what is needed is a smaller easier to read tag for use in dense environments that can be installed in a more efficient and accurate manner in data centers and communication installations having existing untagged patch cables and ports.

SUMMARY

In an exemplary embodiment of the present invention, the identification tag comprises a tab portion having a unique identifier disposed thereon, an anchor portion to attach the tag to one of a patch cable and a port disposed in a patch panel; and a tether portion connecting the tab portion to the anchor portion of the tag. A permanent pressure sensitive adhesive can be applied to the anchor portion to secure the exemplary tags to one of the patch cable and the port disposed in a patch panel. In an exemplary aspect, the tag portion, anchor portion and the tether portion of the tag are formed as an integral structure that is cut from a polymer sheet stock material. In another aspect, the unique identifier is a two-dimensional code, such as a bar code or a quick response code and can be printed as an inverted image of a two-dimensional code on the tab portion to provide improved network security and prevent reading of the unique identifiers by unapproved reading devices.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIG. 6 is an isometric view of an exemplary attachment tool which can be used to apply the exemplary tags on an array of patch cords.

FIGS. 8A and 8B shows two views of an exemplary embodiment of an in-line reading device according to an aspect of the invention.

FIG. 8C shows a view of an alternative exemplary embodiment of an in-line reading device according to an aspect of the invention

FIGS. 10A-10D shows four views of an exemplary embodiment of an off-axis reading device according to an aspect of the invention.

FIGS. 12A-12D show four views of an alternative reader head useable in an off-axis reading device according to an aspect of the invention.

Figure 1A:
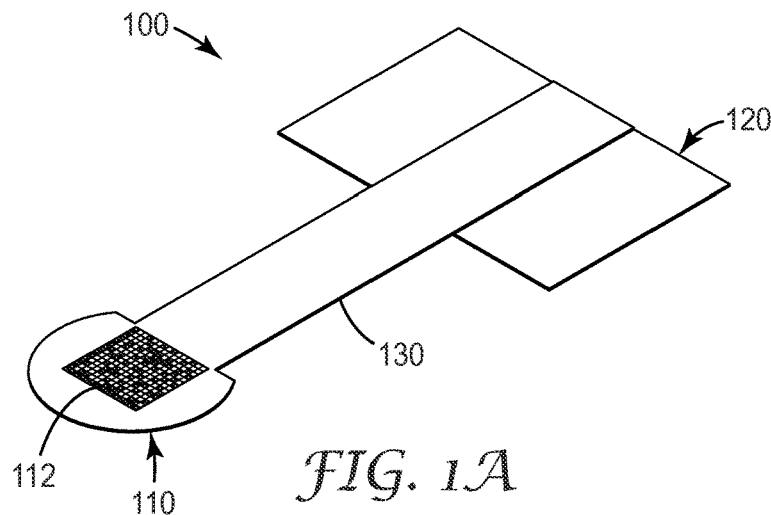
FIGS. 1A-1C are schematic diagrams of three exemplary tags according to an aspect of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

In a first exemplary aspect, a new identification tag can be attached to each end of the patch cables and to each jack/adapter position on the patch panels in the patch panel bays located in, for example, a fiber distribution hub, or a rack in a telecommunications closet, a datacenter, a central office or an outside plant cabinet. Each tag includes a tab portion having a unique identifier, an anchor portion which can be connected to each end of a patch cable or to a jack/adapter disposed in the patch panel and a tether portion which connects the tab portion to the anchor portion of the tag. The unique identifier can be a miniature two-dimensional code such as a quick response (QR) code or a bar code that is created by printing, laser ablation, photo-bleaching, or other suitable means of marking on the tab portion of the tags. The two-dimensional codes can uniquely identify each end of a patch cable and/or the jack/adapter to which the ends of the patch cords are connected.

In another exemplary aspect, a registration carrier assembly is disclosed that allows parallel tagging of an array of individual patch cord connectors or ports/jacks/adapters of a telecommunications patch panel. The inventive registration carrier assembly makes use of the high degree of geometrical regularity in fiber optic patch panels to create multi-tag templates that can be easily applied to patch cords, patchcord connectors and/or ports/jacks/adapters without disturbing any of the connections. The ganged application of pre-printed tags allows robust, efficient and tidy installation of tags without needing to disconnect an optical connection. The registration carrier assembly comprises a first pressure sensitive adhesive coated registration element or registration carrier with a registration feature to register multiple tags to their corresponding connector or port (i.e. jack or adapter). After the individual tags are attached to the patch cords, patchcord connectors and/or ports/jacks/adapters, the adhesive coated registration carrier can be easily removed, leaving the tags permanently attached to the individual connector or port. Because each tag in the array is pre-numbered, and the layout of the individual tags in the array is known, only one tag (e.g. the right-most) needs to be read into the database and all other tags in the array can be inferred based on the original numbering of the tags affixed to the registration carrier. This tag installation and data input method greatly reduces the number of tags that need to be read in order to fully populate the database. Thus, the method of applying multiple tags simultaneously can result in enormous savings in labor when doing new retrofit tagging of the patch cables connections in data centers or other communication installations.

FIG. 1A shows an exemplary new identification tag 100. Each tag includes a tab portion 110 having a unique identifier 112 disposed on at least one side of the tab portion, an anchor portion 120 which can be connected to an end of a patch cable, connector on a patch cable, or to a jack/adapter disposed in the patch panel and a tether portion 130 which connects the tab portion to the anchor portion of the tag. The tab portion and the tether portion of the exemplary tag can be either punched, die cut, laser cut, or otherwise formed to the appropriate shape from an appropriate stock material. In an exemplary aspect, the stock material can be formed into sheets from flexible plastics, nonwoven materials, durable papers, laminates of paper and plastics, and the like, and the anchor portion can be in the form of an adhesive tape segment which is cut to the appropriate size and applied over the free end of the tether portion opposite the tab portion. The adhesive tape segments should comprise a second pressure sensitive adhesive or permanent adhesive with high tack, low flagging and good adhesion to surfaces, including low surface energy surfaces, that has been applied to one side of a robust backing material, such as those described for the tab and tether stock material. In an exemplary aspect, the second pressure sensitive adhesive can have a higher bond strength to the surface to which it is applied than the first pressure sensitive adhesive has to the material of which the exemplary tags are made. This difference in bond strength provides differential release of the tags from the registration carrier when the tags are adhered to the geometrically regular set of objects.

Exemplary first pressure sensitive adhesive can be a repositionable adhesive or other low tack adhesive while exemplary adhesive tapes that can be used to create the anchor portion of the exemplary tags can be selected from the 3M brand 300, 500, 600 700 800 and 900 series of adhesives.

In an alternative aspect, the second pressure sensitive adhesive can be applied onto the anchor portion of tag. Preferred adhesives for this application would be chosen from 300LSE High-Strength Acrylic Adhesive, 320 High Tenacity Acrylic Adhesive, 350 High Holding Acrylic Adhesive, 700 Synthetic Rubber Adhesive, 800 Natural Rubber Adhesive and 900R Rubber Adhesive, each of which is available from 3M company (ST. Paul, Minn.).

One advantage of using a tag with a flexible tether portion disposed between the tab portion and the anchor portion is that the interaction of the tag with the reader is literally much more flexible. This allows the reading of the tag to be accomplished much more easily and with much less potential for interfering with the signal connection.

While the tab portion 110 of tag 100 shown in FIG. 1A is generally circular, the tab portion may be of any two dimensional shape that provides sufficient room to accommodate the unique identifier. However, the maximum size of the tag portion is limited such that it will not overlap with another tag portion disposed on an adjacent patch cord, Jack or adapter. For example if the patching system being tagged is an RJ-45 based panel, the maximum size of the tag portion should be less than or equal to about 8 mm. If the patching system being tagged is based on the SC optical connector format panel, the maximum size of the tag portion should be less than or equal to about 6 mm, while if the patching system being tagged is based on the LC optical connector format panel, the maximum size of the tag portion should be less than or equal to about 5 mm. In an exemplary aspect, the size of the die cut tab is preferably less than 5 mm in width, more preferably less than 4 mm in width. Most preferably, the width of the tether portion of the tag is no more than about 80% the width of the tab portion of the tag.

In an alternative aspect, a stripe of second pressure sensitive adhesive or permanent adhesive that has good adhesion may be coated or otherwise applied to a roll of suitable stock material. It should be understood that the second pressure sensitive adhesive may be in the form of a transfer adhesive, or double sided tape where the adhesive on one side is the same or different from the adhesive on the other side, or other constructions known in the art. It should also be understood that "permanent" still allows for the possibility that the adhesive may be intentionally removed. In such cases, it is preferred that the adhesive allow for clean removability. A release liner can be applied over the adhesive coated side of the stock material. The tags can be cut to the appropriate shape from the coated stock material such that the tag portion, anchor portion and tether portion are a single unit formed of the sheet stock material. Appropriate cutting methods are die cutting, laser cutting or other suitable technique known in the art.

Subsequently the carrier web can be laminated in registration over the intact, die cut tag material. Prior to the lamination, a window may be die cut into the carrier web if desired. After laminating the carrier web over the tag material, the non-tag portions of the tag stock material (the so-called "weed") can be peeled away from the carrier web, leaving only the tags remaining attached to the carrier web.

After the weed surrounding the tags has been removed, a release liner can be applied to the carrier, sandwiching the tags between the carrier and the release liner. In some embodiments it is useful to slit the release liner into two or more longitudinal sections prior to application to the carrier. The multiple sections can be removed at different points during the installation process to minimize the exposure of bare adhesive as well as to maintain the structural integrity of the construction during the installation process.

Figure 2:
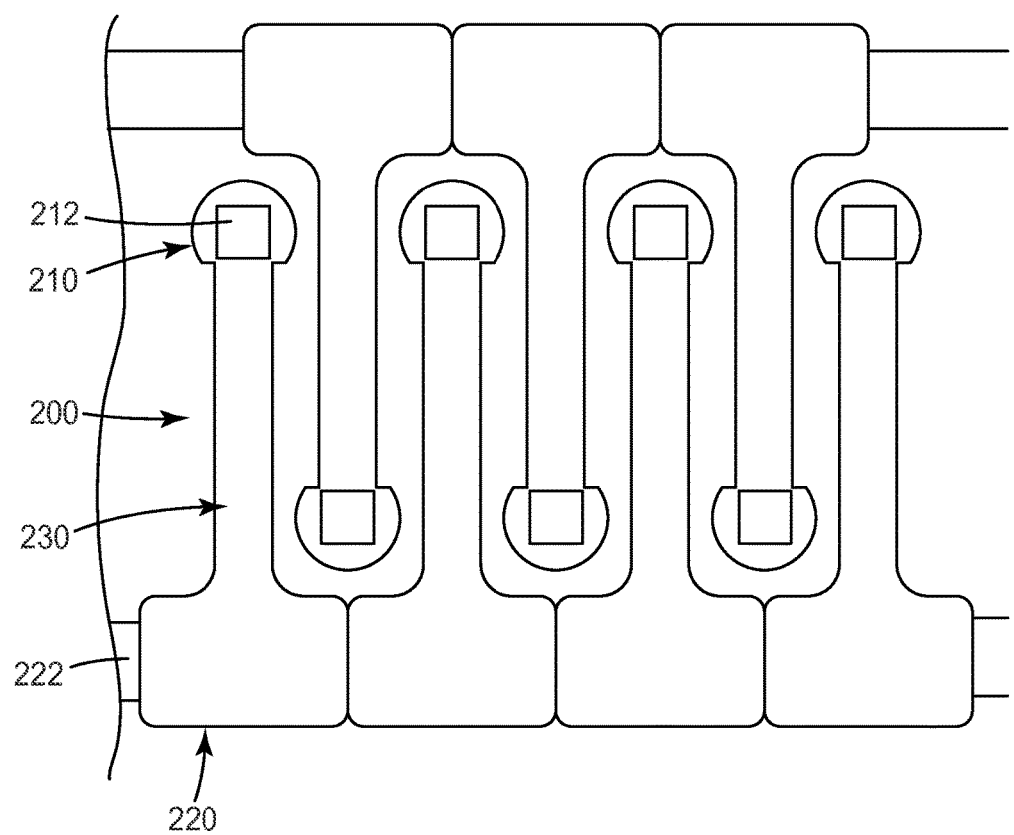
FIG. 2 shows an alternative exemplary tag according to an aspect of the invention.

FIG. 2 shows an exemplary method of constructing the labels such that waste of the label stock is minimized. The individual tags 100 are interwoven to maximize the material and manufacturing efficiency. While not shown, both the carrier sheet as well as the release liner may be cut in a similar interwoven style to maximize manufacturing efficiency.

The unique identifier can be a miniature two-dimensional code such as QR or bar codes that is printed or otherwise applied to the tab portion of the tags. The two-dimensional codes can be used to uniquely identify an end of a patch cable and/or the jack/adapter to which the patch cords is connected. The unique identifiers can be made by creating a two-dimensional data matrix or bar code on a substrate. The technique for creating the unique identifier must have sufficient resolution to print a 14×14 two-dimensional data matrix onto a square of dimensions no greater than about 5×5 mm, more preferably no greater than about 4×4 mm. In one aspect, the unique identifiers can be printed directly onto the stock material comprising the tab portion of the tag, or in an alternative aspect, the unique identifiers can be printed onto a separate substrate that can be laminated onto the sheet stock material. Alternatively, a clear separate substrate material can be laminated over the unique identifier disposed on the tab portion of the tag in order to protect the printing from wear or possible abrasion.

The identifiers may be created at any point in the manufacturing process. Those skilled in the art will recognize that the tags require a high level of registration in their construction and so it is most preferred to create the identifier at the same time as the lamination and cutting steps.

The printed unique identifiers must be sufficiently robust to not be easily damaged through regular handling associated with the manufacture and installation of the exemplary tags. Alternatively, if the unique identifiers are printed directly on the tab portion of the exemplary identification tags, a transparent protective layer can be applied to the tab portion of the tags to protect the unique identifier from damage due to regular handling.

A number of ways exist to create the two-dimensional codes for the unique identifiers on the tab portions of the exemplary tags. However, due to the small size of the unique identifiers, high resolution techniques will likely have an advantage over more conventional techniques. For example, even if conventional desktop printer has sufficient resolution, there may be issues with the permanence of the print, proper registration of the identifier to the tab as well as with printer to printer variability. Commercial printing and laser marking techniques may be more appropriate in this application, especially since these techniques can be employed in a web-based process that may be more suitable for the production of the tags as well as their registration requirements. Industrial inkjet or UV inkjet techniques may also be viable processes for printing the unique identifiers.

In an exemplary aspect, a laser may be used to selectively destroy a reflective layer contained within the tab construction, thereby changing the tag reflectivity in an image wise manner. Potential substrates that might be used in such an application could be for example Vikuiti™ Enhanced Specular Reflector (ESR). For example a reflective multi-layer optical film (MOF) can be laminated to a black substrate or perhaps coated with a black coating. When illuminated, the MOF would reflect the illumination light. However if a laser were used to selectively destroy the MOF, exposing the underlying black substrate, then an image wise reflection could be created in the form of a two dimensional code. Suitable laser wavelengths could be in infrared, visible or ultraviolet (UV) spectra for the creation of the image. The MOF reflectivity can also be chosen from a range of wavelengths, generally from near IR to visible to UV-A. Vikuiti™ ESR-B is an exemplary black overcoated reflective film.

In an exemplary aspect, a transparent overlay can be placed on top of the MOF prior to imaging if the transparent layer is transparent to the laser radiation used to create the image such that the transparent layer would not be damaged by the imaging laser. This would allow the image to be preserved under a protective layer without requiring that the protective layer be placed after imaging.

In some instances, the unique identifier is preferred to not be visible to the eyes and only readable by machine. In such cases, inks that are transparent in the visible and reflective or absorbing in the near IR or near UV may be used. Similarly, substrates such as MOF with similarly tailored reflection or transmission spectra may be used.

In an alternative aspect, the stock material used to create the exemplary tags can be controllably and reversibly stretched above its glass transition temperature (Tg), and quenched under tension so that it remains in the strained state. The unique identifiers can be printed onto this expanded sheet stock material using a low resolution printing method. The tags can be formed by kiss cutting, stamping or one of the other methods mentioned previously, then the sheet stock material can be heated above the material's Tg. The material will elastically recoil back to its original dimensions yielding a tag having a small high resolution unique identifier printed thereon.

Figure 1B:
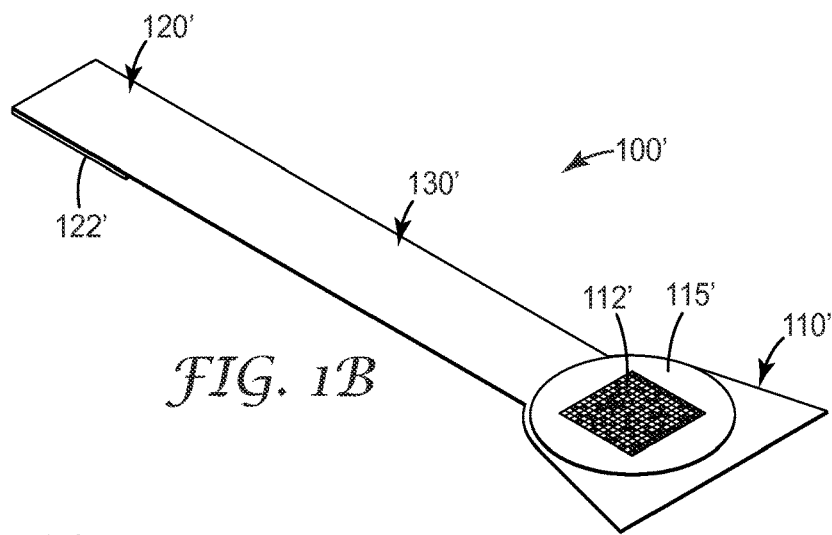

FIG. 1B shows an alternative exemplary tag 100'. Tag 100' includes a tab portion 110' having a unique identifier 112' disposed on at least one side of the tab portion, an anchor portion 120' which can be connected to each end of a patch cable or to a jack/adapter disposed in the patch panel and a tether portion 130' which connects the tab portion to the anchor portion of the tag. Tab portion 110' of tag 100' shown in FIG. 1B has a generally flared shape. In this embodiment, the tab portion, the anchor portion and the tether portion are a single unitary piece of material. A second pressure sensitive adhesive or permanent adhesive 122' with good adhesion to plastic surfaces is disposed on one side of the anchor portion 120' on a side opposite the side where the unique identifier 112' is printed. In an exemplary aspect, the tab portion 110' can include a transparent protective cover film 115' disposed on top of the unique identifier to prevent marring the identifier through regular handling. The exemplary transparent protective cover film can be polyester, polystyrene, acrylic etc.

Figure 1C:
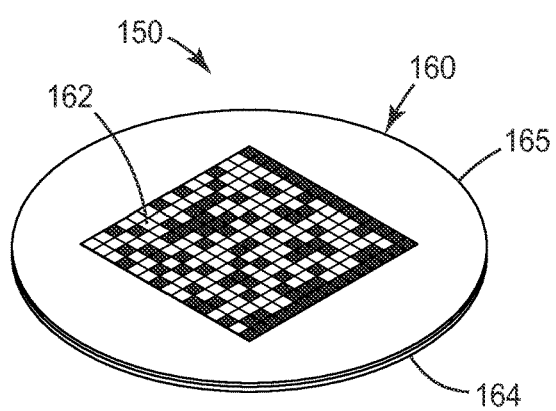

FIG. 1C shows an alternative exemplary port tag 150 for use on the port of a patch panel. Because of the configuration of the ports, (i.e. they have a flat surface on which the exemplary port tag can be mounted) port tag 150 includes a tab portion 160 having a unique identifier 162 disposed on at least one side of the tab portion, and a second pressure sensitive adhesive 164 with good adhesion to plastic surfaces is disposed on a side of the tab portion side opposite the unique identifier. In an exemplary aspect, the tab portion 160 can include a transparent protective cover film 165 disposed on top of the unique identifier to prevent marring the identifier through regular handling. The second pressure sensitive adhesive on the back of the tab portion can be used to connect the port tag to a jack/adapter disposed in the port of a patch panel. Tab portion 160 of port tag 150 has a generally circular shape. In an exemplary aspect, port tag 160 can be thicker than the tag 100' which is used to mark the patch cable. This thickness difference can allow the port tag for the port to act as a stub that interacts with the reading head of the reader device in a different way than the tag 100' for the patch cable as will be described in additional detail below.

In an exemplary embodiment, the size of the unique identifier 112' on the tab portion of tag 100' can preferably be about 4 mm by about 4 mm and more preferably can be about 3 mm by about 3 mm. The tag portion 110' of the tag can preferably be less than or equal to about 5 mm across where the unique identifier is printed and more preferably less than about 4 mm across. The small size of the tab portion and of the tags overall allows the tags to be effectively used in very high density labeling situations.

Advantageously, the tags/port can have of unique geometric shapes, different styles of the unique identifiers and/or different colors to differentiate between port tags used on the ports on patch panels, and the tags on the ends of patch cables. The material selection of the tags may also be varied to differentiate between the type of patch panel system (i.e. a copper or electrical based patch panel and an optical base patch panel) or for different classifications of a patch panel system. For example, the characteristics of the tags used to label a Category 5 based patch panel system may differ from the characteristics of the tags used to label a Category 6 based patch panel system. This concept can be similarly applied to optical patch panel systems to differentiate between single mode and multimode fiber patch panels or between SC connectors patch panels versus LC connection patch panel systems. These types of characteristics can also be captured, by an exemplary reader device, saved and associated with a given unique identifier to provide additional dimensions on the information conveyed by reading a given tag.

Figure 3:
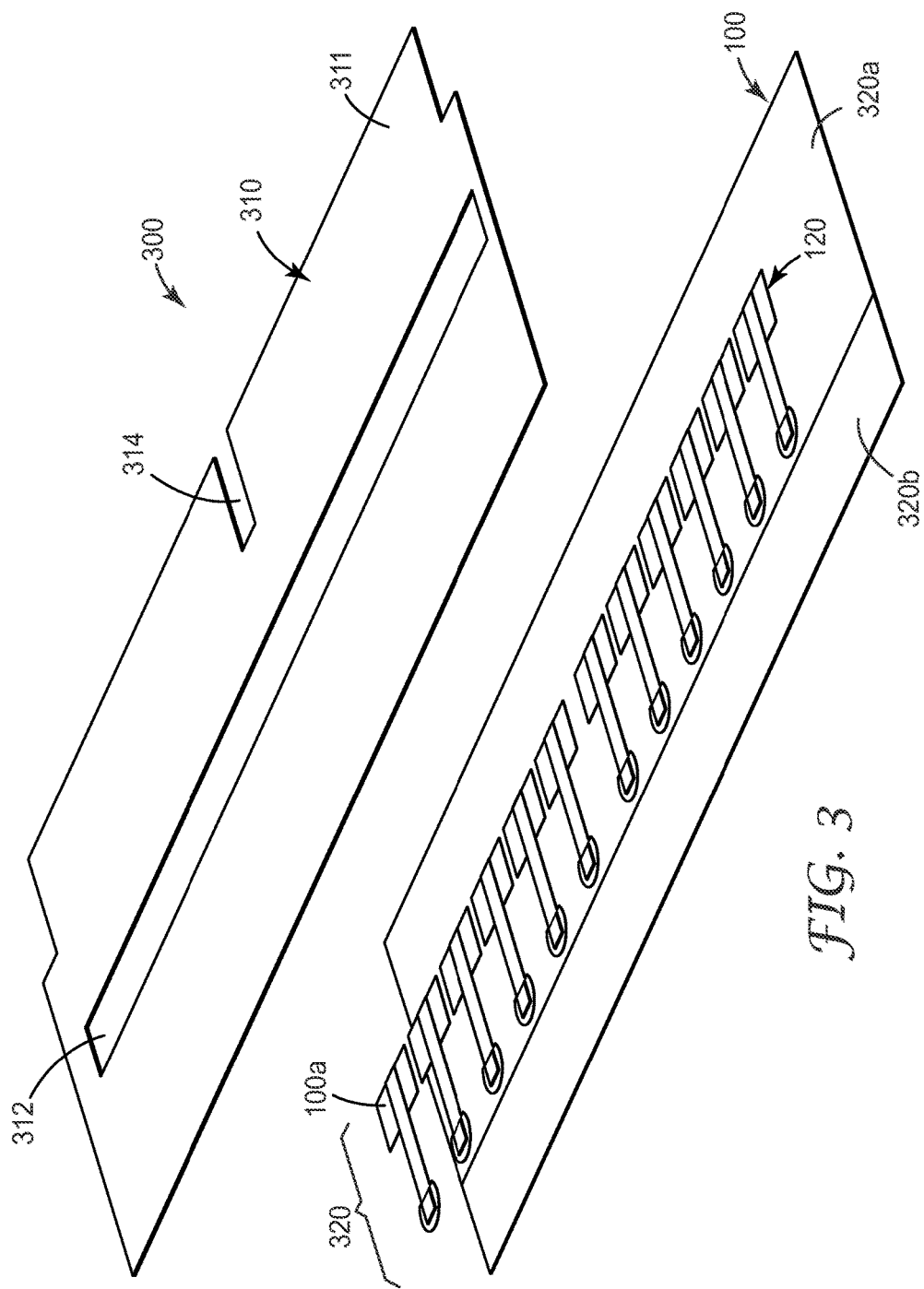
FIG. 3 is an exploded view of an exemplary registration carrier assembly to enable parallel tagging of an array of individual fiber optic connectors or ports according to an aspect of the invention.
Figure 4:
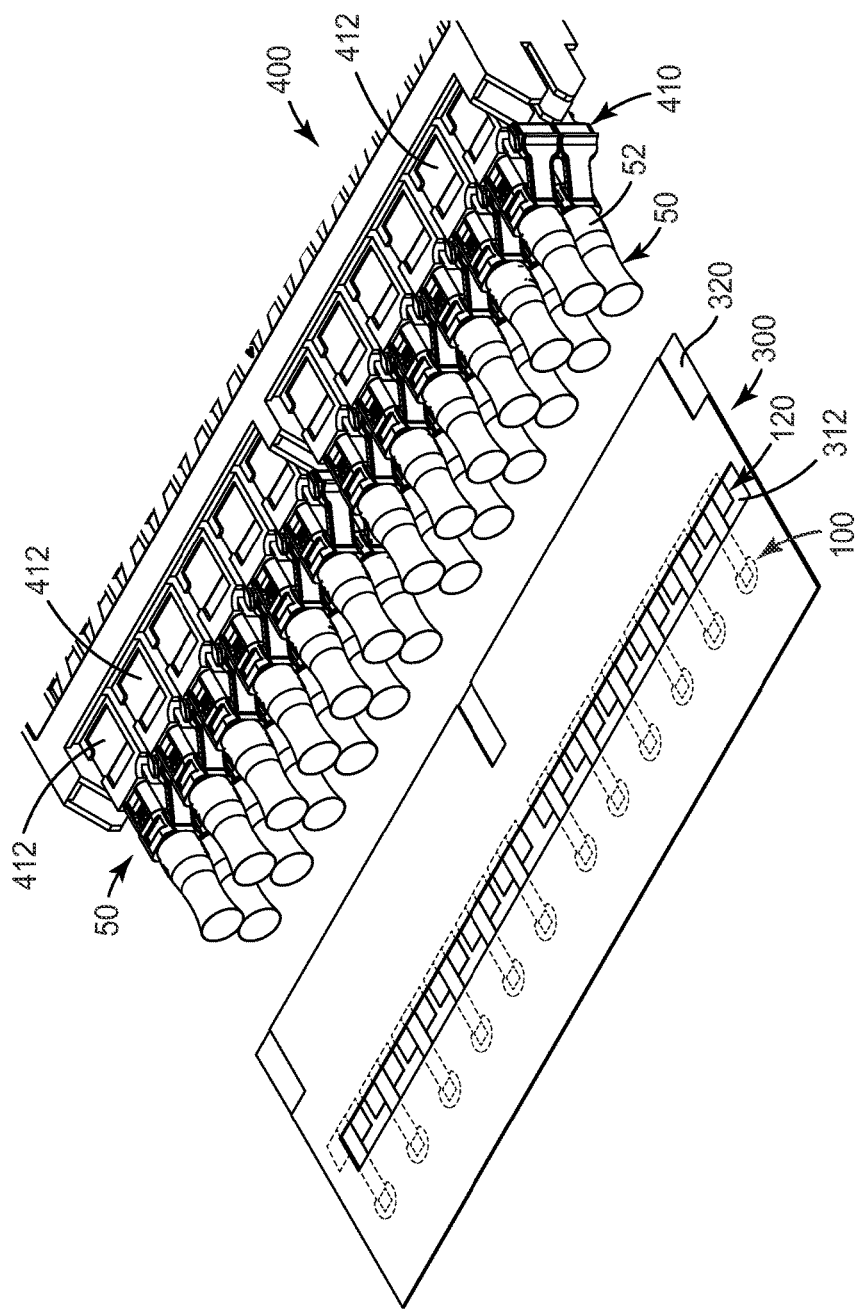
FIG. 4 is a view of the registration carrier assembly of FIG. 4 shown in relation to an exemplary patch panel.

FIG. 3 shows an exploded view of an exemplary registration carrier assembly 300 to enable parallel tagging of an array of individual fiber optic connectors or ports. An assembled top view of exemplary registration carrier assembly is shown in FIG. 4. A plurality of tags 100 are arranged in a regular linear array that is suitable for identifying a geometrically regular set of objects such as is commonly encountered in patch panels in data centers and communication installations. In an exemplary aspect the registration carrier assembly includes a die cut registration carrier 310 having adhesive 322 (FIG. 5A) disposed on one side of the registration carrier. The registration carrier includes a generally rectangular frame 311 optionally having a window 312 disposed therethrough within the frame and at least one registration feature 314 located along one longitudinal edge of the frame. An array of tags is fixed to the adhesive side of the registration carrier such that at least a portion of the anchor portion 120 of the tags is disposed in the window as shown in FIG. 4.

The registration feature 314 can be configured to match up or align with feature(s) on the patch panel to ensure proper positioning of the registration carrier assembly relative to the patch panel or other geometrically regular set of objects to be tagged. The size and shape of the registration feature will vary depending on the features of the array of objects to which the tags will be attached. In the exemplary embodiment of FIG. 3, the registration feature 314 is in the form of a rectangular notch located at the mid-point of the longitudinal edge that is configured to fit around projection 414 on patch panel 400 as shown in FIG. 5B. Alternatively, the exemplary registration carrier assembly can include a plurality of registration features such as notched or clipped corners and the shape, number and position of these registration features should not be deemed a limiting feature of the present invention.

In an exemplary aspect, the adhesive on the registration carrier can be chosen from a variety of adhesives, however most preferable would be a repositionable adhesive with good adhesion to plastic, but which can be cleanly removed with low to moderate peel force.

A split release liner 320 can be applied to the back of the registration carrier assembly opposite the die cut registration carrier to cover the exposed adhesive. In an exemplary aspect, the release liner can be a split release liner having a first section 320a disposed over a first portion of the registration carrier assembly that includes the window through the registration carrier and the anchor portions of the plurality of regularly spaced tags disposed across the window in the registration carrier and a second section 320b disposed over a second portion of the registration carrier assembly where the tab portions of the plurality of regularly spaced tags are affixed to the repositionable adhesive on the registration carrier.

FIG. 4 shows how the spacing geometry of the registration carrier assembly 300 aligns with the port array 410 that comprises a plurality of adapters 412 (e.g. LC adapters) and the connectors 50 (e.g. LC connectors) on the end of patch cables (not shown) in a typical patch panel such as optical fiber patch panel 400.

Figure 5A:
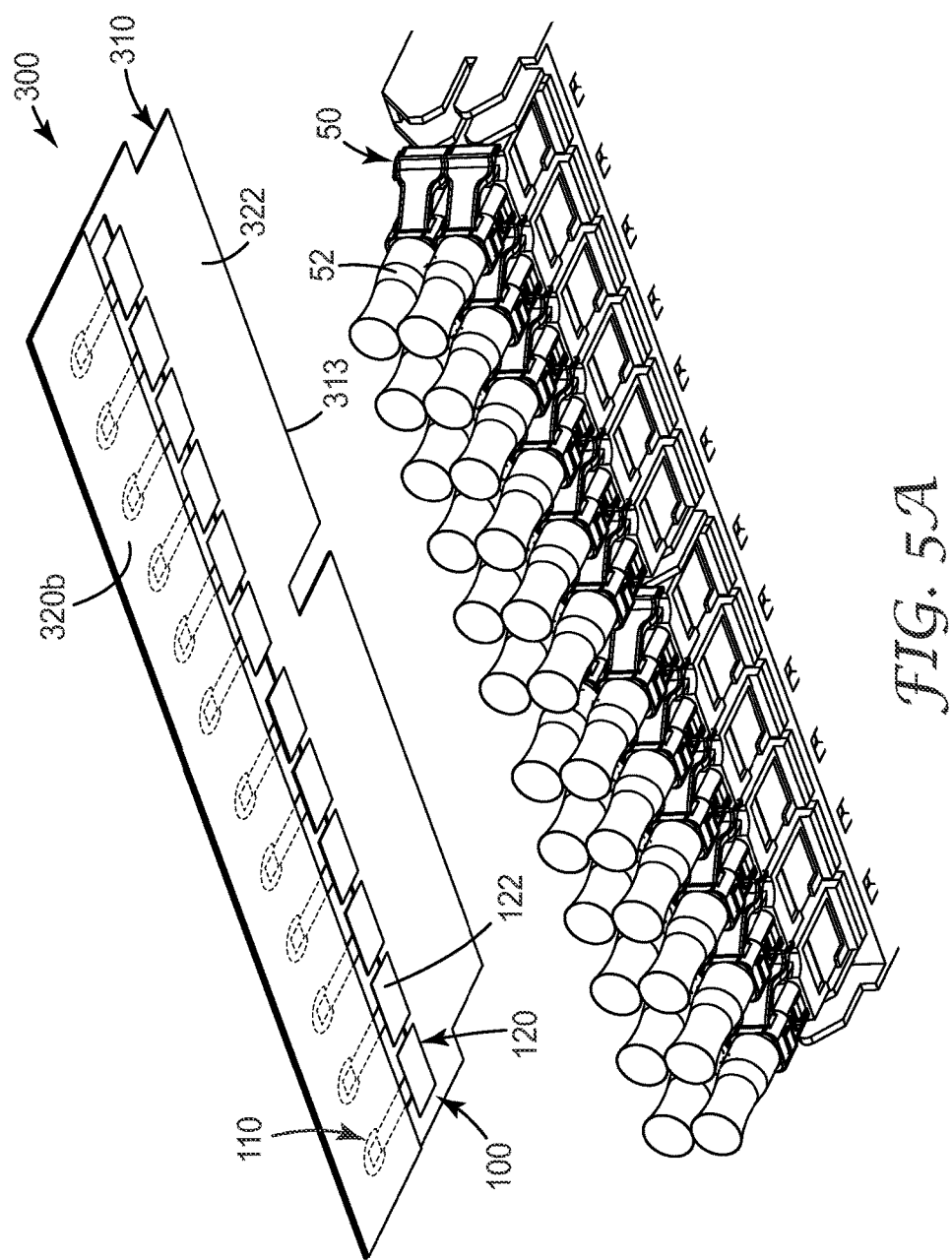
FIGS. 5A-5F illustrate an exemplary method for applying the exemplary tags on an array of patch cords.
Figure 5B:
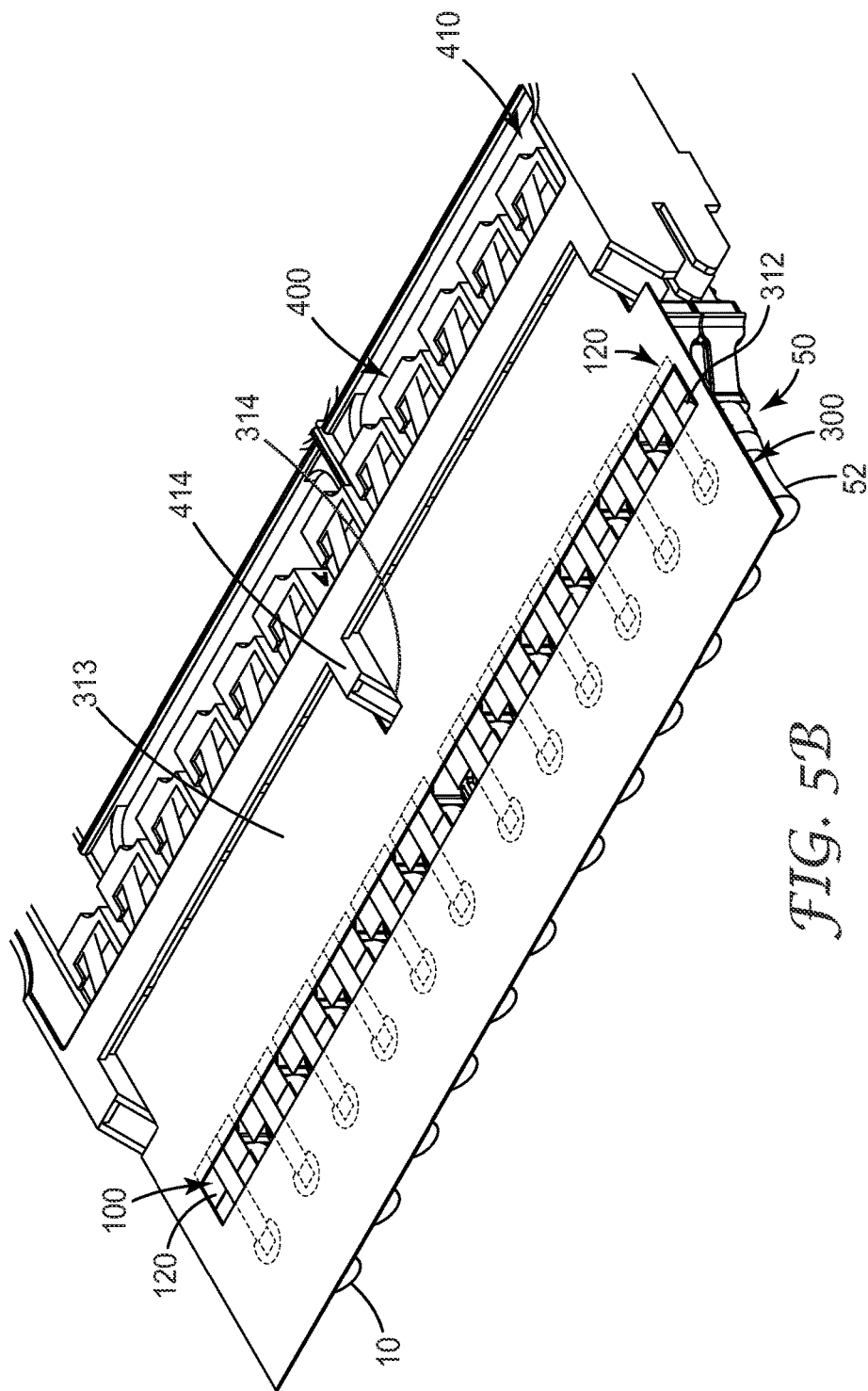

To install the tags on connectors 50, the first section of the split liner is removed leaving only the second section 320b of the split release liner attached to the registration carrier 310 as shown in FIG. 5A. In an exemplary aspect, tags 100 can be attached to boot 52 of connectors 50 as follows. Removing the first section of the split release liner exposes the adhesive 322 on the leading longitudinal edge 313 of registration carrier 310, as well as the adhesive 122 on the anchor portions 120 associated with each tag 100. FIG. 5A shows the bottom side of the registration carrier assembly 300 with the first section of the split release liner removed. As can be seen the registration carrier adhesive (i.e. the first pressure sensitive adhesive 322) and the second pressure sensitive adhesive 122 on the anchor portion 120 of the tag 100 are exposed, while the tab portion 110 is still covered by the second section 320b of the split release liner.

FIG. 5B shows registration carrier assembly 300 being adhesively attached to the port array 410 of patch panel 400. Centering the laminate on the central post 414 of the array using the registration feature 312 on the leading longitudinal edge of registration carrier 310 provides for simple registration of the registration carrier assembly 300 to the port array such that the anchor portions 120 of the tags 100 are aligned above the mounting locations on the individual patch cables 10 to which they will be applied.

Figure 5C:
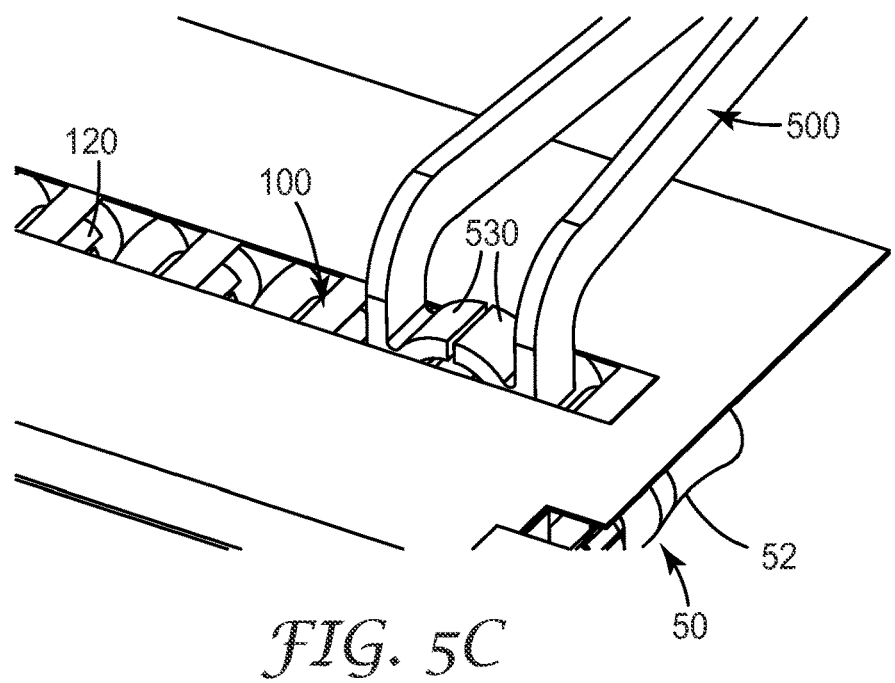
Figure 5D:
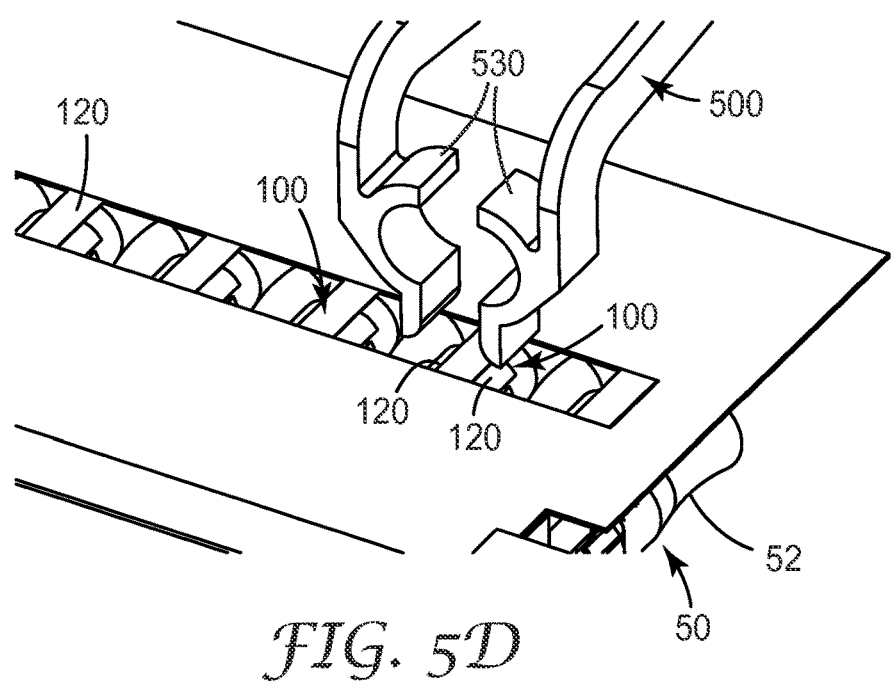

FIGS. 5C and 5D show how an attachment tool 500 is used to securely attach the anchor portion 120 of a given tag 100 at the chosen mounting location on the individual patch cable. A detailed view of the tool is shown in FIG. 6. Attachment tool 500 resembles a pair of specialized tweezers comprising two arms 510, 520 that are joined at the first end 501 of the attachment tool and have split cylindrical gripping portions 530 disposed at the second free ends 502 of the two arms. The split cylindrical gripping portions of the attachment tool are used to initially wrap the tape flag around the chosen mounting location. The diameter of the cylindrical portion of the tool is chosen to generally be the same as the diameter of the chosen mounting location on the selected patch cable. The selected mounting location may be, for example as shown in FIG. 5A, the boot 52 on the connector 50 or even the fiber optic cable of the patch cord (not shown) on which the connector is mounted. While the gripping portions of tool 500 have a split cylindrical shape, other tool shapes are possible depending on the selected mounting location on which the tag is to be mounted and the mounting location's geometry.

Figure 5E:
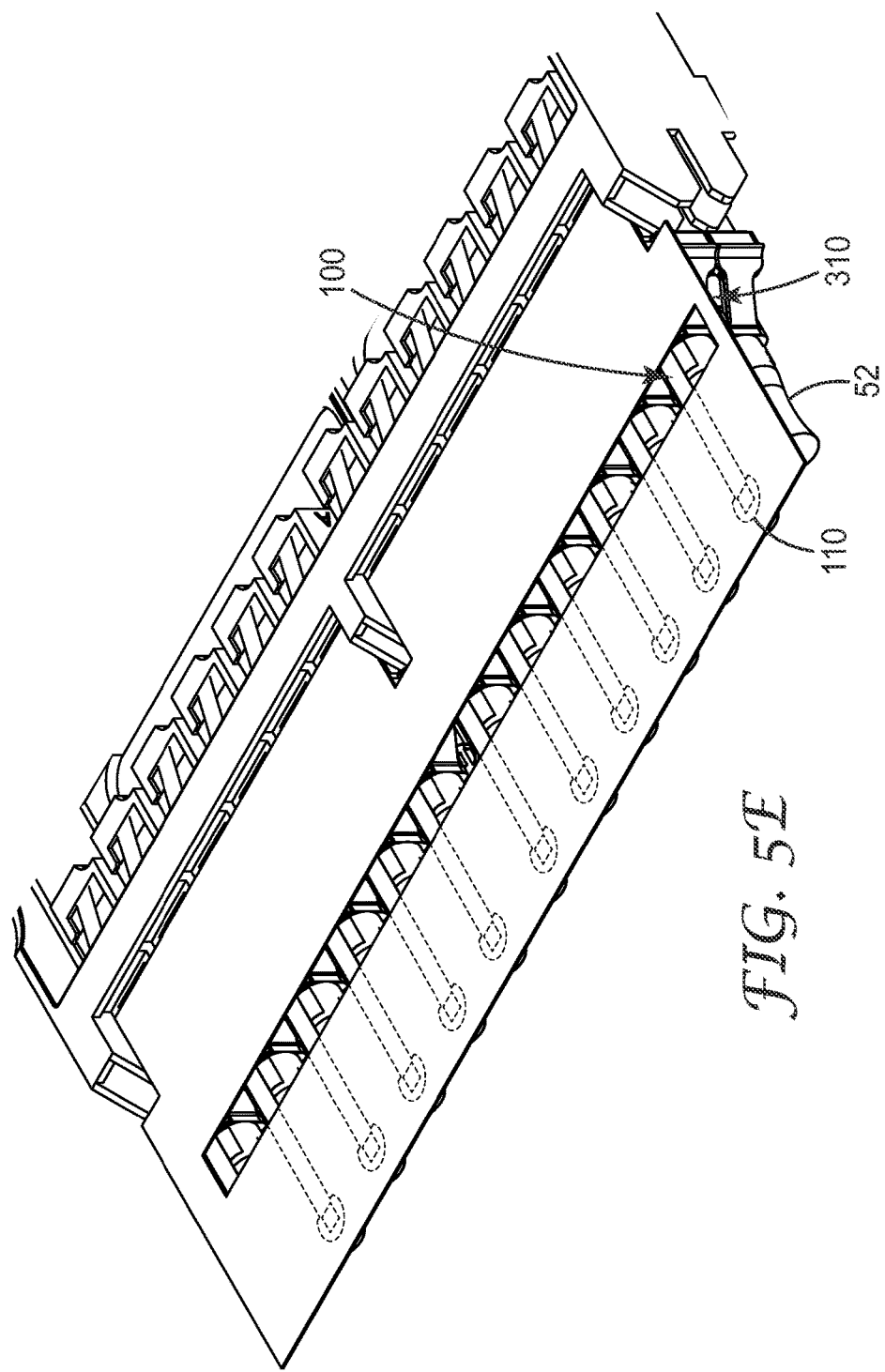
Figure 5F:
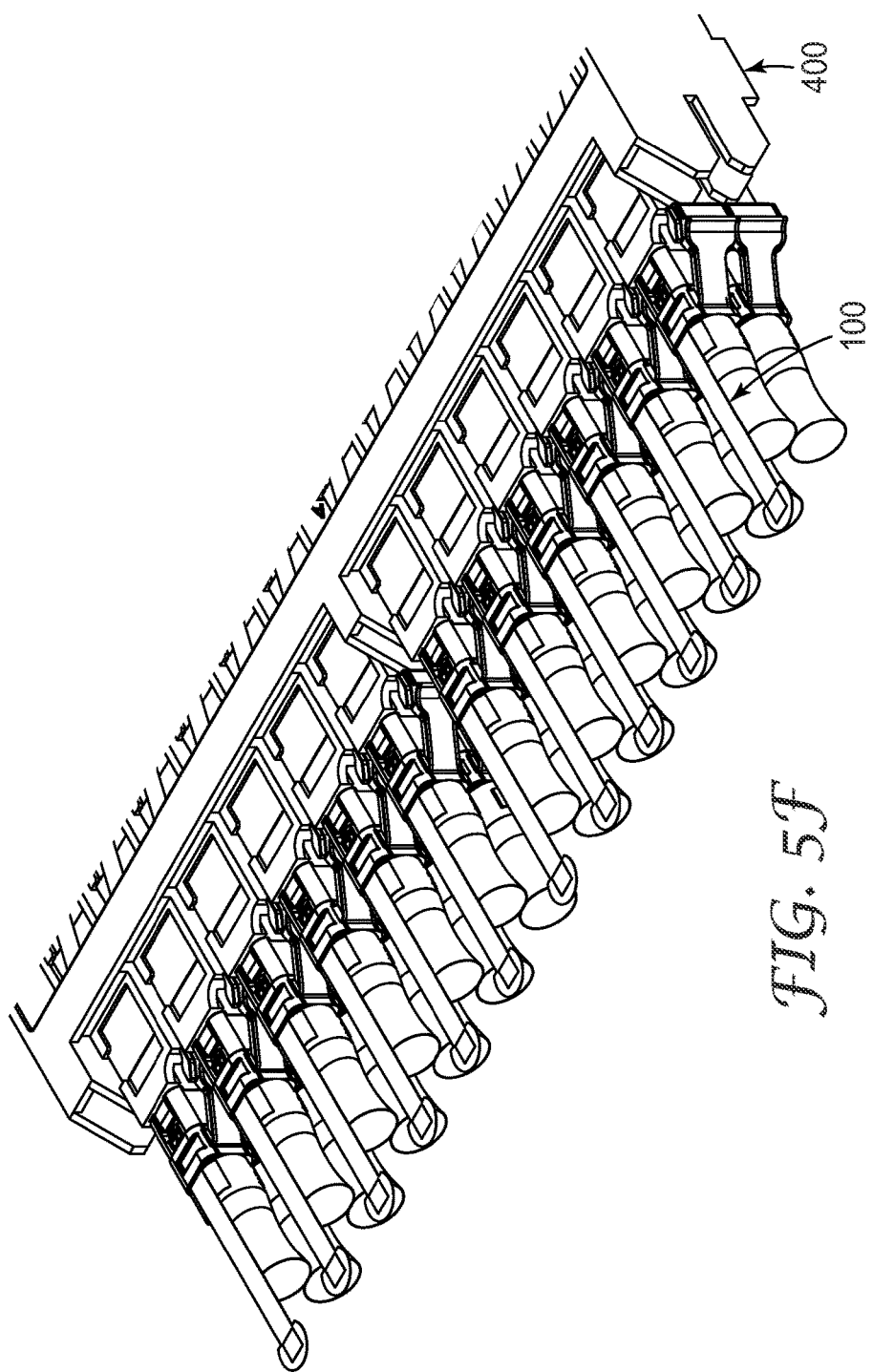

FIGS. 5C and 5D show how the form fitting split cylindrical gripping portion 530 of attachment tool 500 is used to firmly and completely affix the anchor portion 120 of tag 100 to the selected mounting location. The anchor portion of each tag is affixed in turn using the attachment tool. This technique saves an enormous amount of installation labor by allowing as many as 10 or more tags to be installed in about the same amount of time as manually installing a conventional single tag. FIG. 5E shows the removal of the second portion of the split release liner, freeing the tab portion 110 of tags 100 of the tags. FIG. 5F shows the patch panel 400 after removal of the registration carrier with all of the tags 100 attached to their respective mounting locations. Because the geometry and spacing of the tags in the registration carrier assembly 300 matches that of the ports in the patch panel, the applied tags are also geometrically uniform allowing for easier subsequent reading of the tags.

Figure 7A:
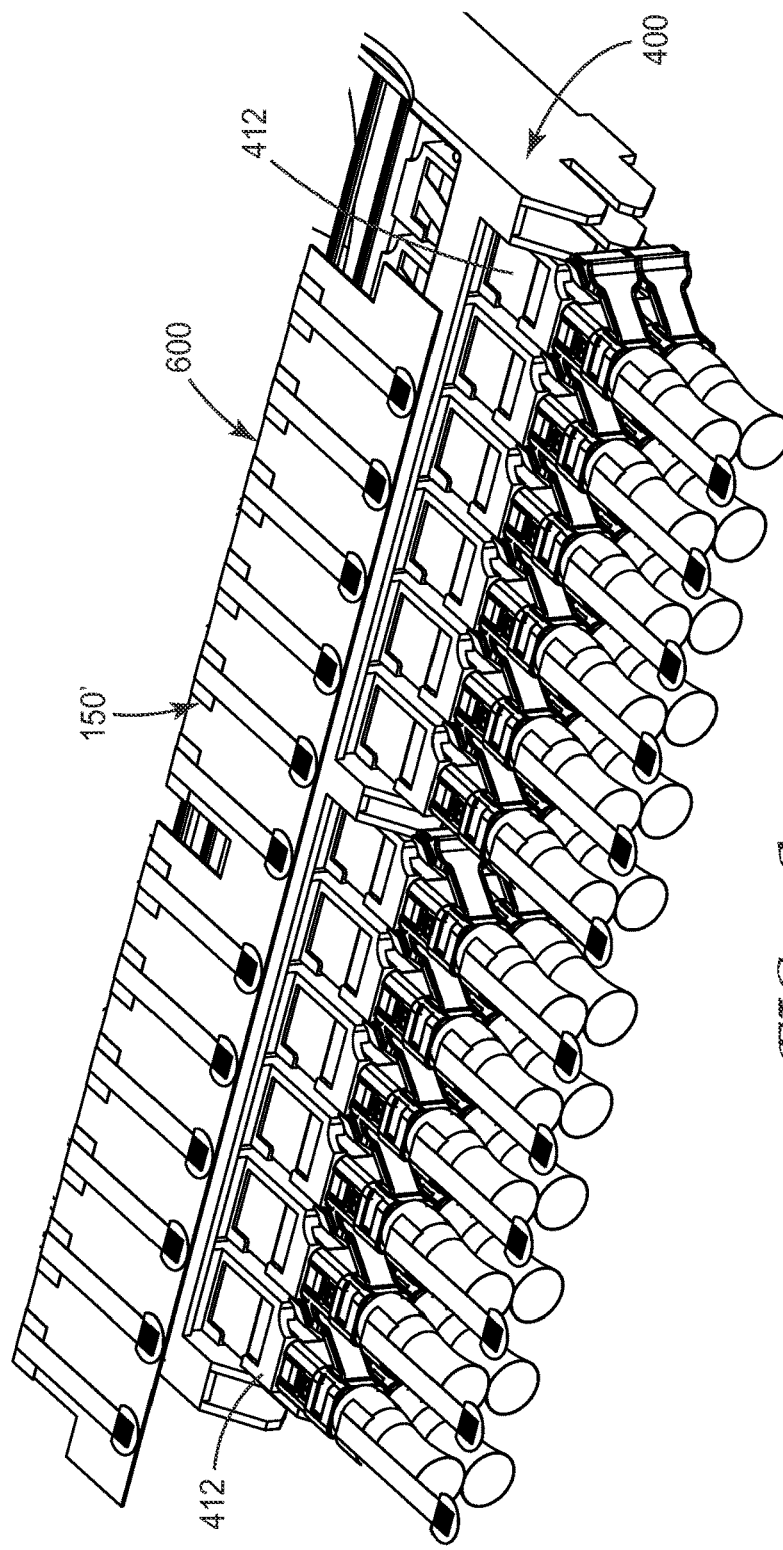
FIGS. 7A-7C illustrate an exemplary method for applying the exemplary tags on a port array of in an exemplary patch panel.
Figure 7B:
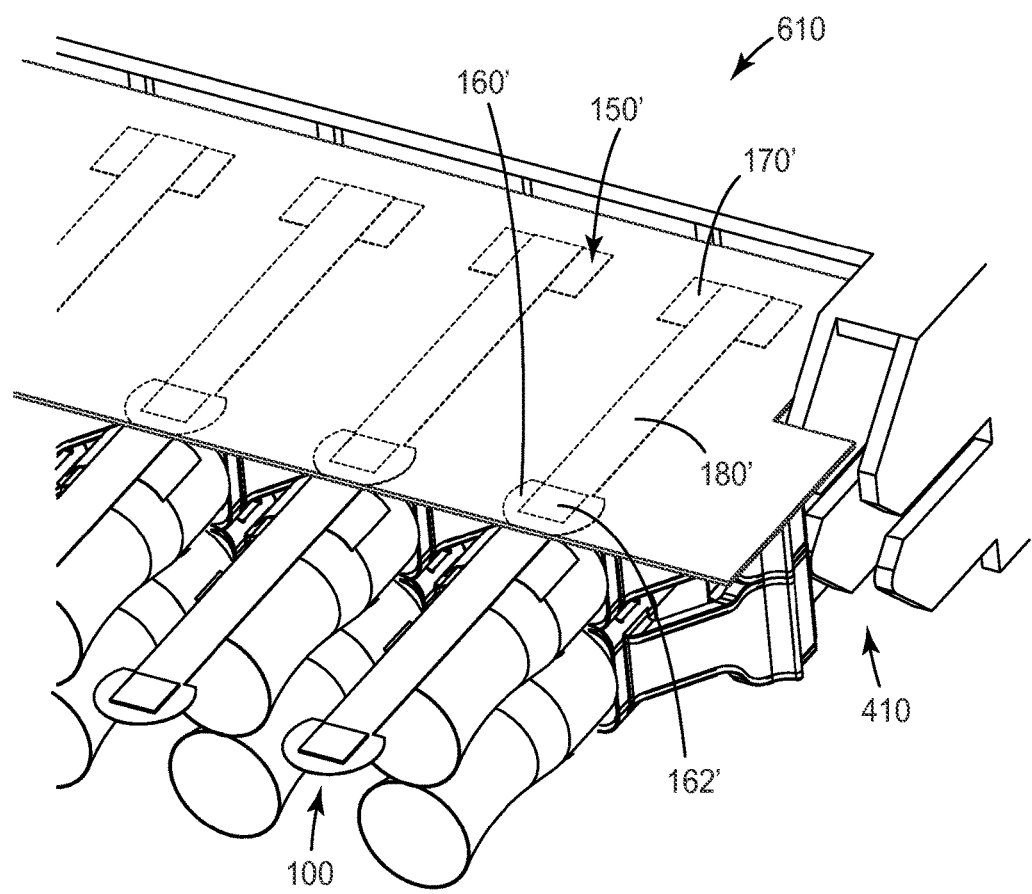
Figure 7C:
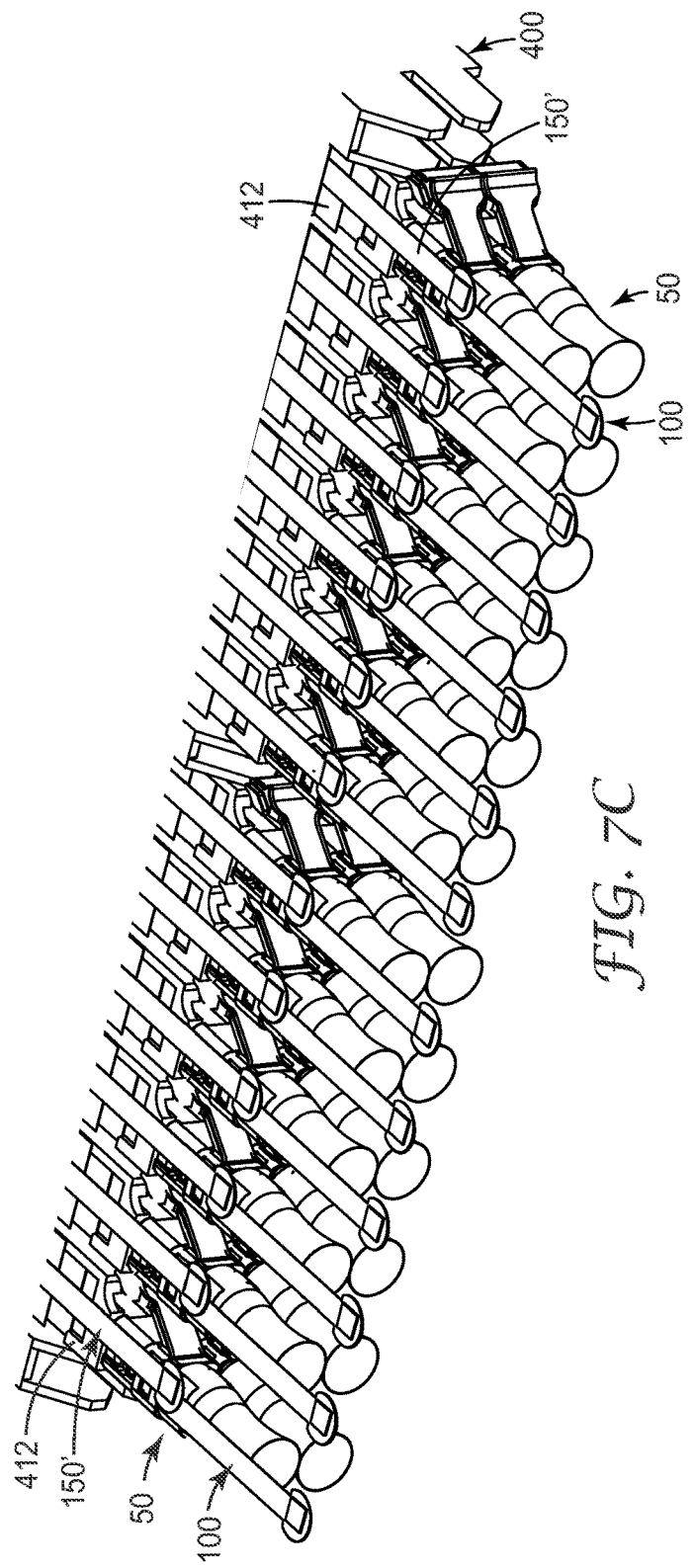

FIG. 7A shows a similar registration carrier assembly 600 optimized for tagging the ports of patch panel 400 having a single release liner. FIG. 7B shows the registration carrier 610 with the release liner removed, and the registration carrier assembly aligned and affixed across the array of ports 410. Since the top surface of the ports is planar, the registration carrier assembly can be registered and affixed and the port tags 150' can be permanently mounted in the same operation. FIG. 7C shows the fully labeled patch panel after removing the registration carrier from the array of ports. The port tags are evident, and they have the same general shape and geometrical regularity as the tags 100 disposed on the array of patch cables.

In particular in one exemplary embodiment, port tag 150' includes a tab portion 160' having a unique identifier 162' disposed on at least one side of the tab portion, an anchor portion 170' which can be connected to a jack/adapter disposed on a port of the patch panel and a tether portion 180' which connects the tab portion to the anchor portion of the port tag. Port tag 150' is essentially analogous to tag 100 shown in FIG. 1A. For example, tab portion 160' of tag 150' can have a generally circular shape, although other shapes are contemplated and should be considered in scope for the current invention. A second pressure sensitive adhesive with good adhesion to plastic surfaces is disposed on one side of the anchor portion 170' on a side opposite the side of the port tag from where the unique identifier 162' is printed.

Because patch panel 400 is a duplex array of ports configured for LC connectors, tagging the bottom array of ports and patch cords may be slightly more challenging, but straightforward by simply inverting the registration carrier assembly(s) and applying the tags/port tags as described above. In an alternative aspect, the second pressure sensitive adhesive can be disposed on the anchor portion of the exemplary tag on the same side as the unique identifier so that the unique identifier can be viewed from above when applied to the bottom array of ports and patch cords in the duplex array.

In another exemplary embodiment, a hand held reader device with a microscope lens system that can read one or more of the unique identifier dimensional codes on the aforementioned tags is disclosed. Reading a single tag identifies a single patch cable or jack entity, and reading multiple tags simultaneously associates these tags. For instance, reading the tag on one end of a patch cable uniquely identifies that patch cable. Reading the tag on the end of a patch cable and the port tag on a jack simultaneously indicates that the patch cable is associated with (i.e. inserted into) that jack.

Images of the tag(s) read by the reading device can be relayed to a processor which deciphers the unique identifier codes on the tags. The unique identifier codes and information correlated with the unique identifier from the read tag(s) can be forwarded and recorded in a storage application, such as a spreadsheet, a database, or another suitable repository. Communications between the reader device, a deciphering mechanism and the storage application can be accomplished through any combination of wired or wireless connections such as Universal Serial Bus (USB) connection, Bluetooth, WiFi, etc. The deciphering mechanism and storage application can reside entirely or partially on a local microprocessor in the reader device, on a "smart" phone or other portable device, or on a network device.

Figure 8A:
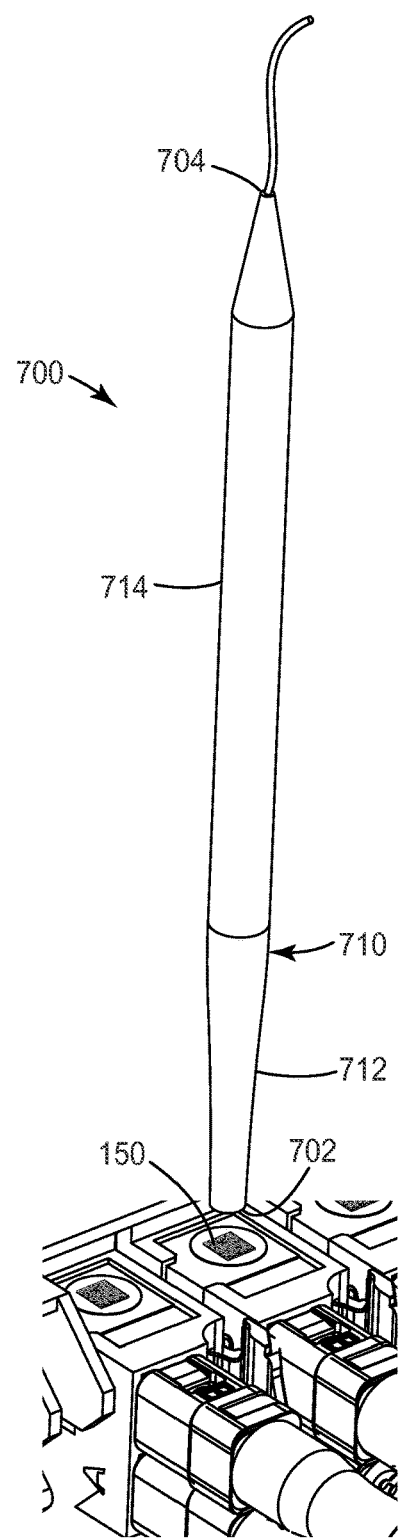

FIGS. 8A and 8B show two views of an exemplary reader device 700 that is capable of reading the exemplary tags described in the present disclosure. Reading a single tag identifies a single patch cable or jack entity, and reading multiple tags simultaneously associates the entities together. For instance, reading the tag on one end of a patch cable uniquely identifies that patch cable. Reading the tag on the end of a patch cable and the tag on a jack simultaneously can be used to indicate that the specified patch cable is associated with (i.e. inserted into) the specified jack. Because of the small size of the tags, the reader device can include microscope optics, a printed circuit board, and a camera module in the reader body 710 of the reader device to effectively read the data matrix codes of the unique identifier codes.

In an exemplary aspect, the reader body 710 can comprise a first body section 712 at a first end 702 of the reader device 700, wherein the first body section holds the optics, electronics and the camera module and a second body section 714 at the second end 704 of the reader device which serves as a handle for the craftsman to manipulate the reader and may contain additional electronics, communication hardware, batteries or other components needed for a specific design. The exemplary reader can include a cord to provide power to the reader and/or to transfer data to a secondary storage device.

In an exemplary aspect, the camera module can be a borescope type camera module. One advantage of borescope type camera modules is their very small size which enables the reader device to be more compact which is exceptionally useful when working having to read tags in a very high density patch panel systems. In terms of optical performance, an exemplary borescope for this application is the XCSOURCE 7 mm Waterproof 200× USB Microscope Inspection Borescope available through Amazon.com.

FIG. 8B is a schematic cross sectional diagram of the first end 702 of reader 700. In this exemplary aspect, reader 700 can include a 50% reflector to direct light, λ, entering the body 710 of the reader through a transparent window 711 in the side of the reader body so that a portion of light will impinge on the tag to be read, e.g. tag 150. Reader 700 is an in-line reader wherein the optical path of the light reflecting from the surface of the tag travels in a generally straight path through the microscope optics 730 to the camera module 735 where the image of the tag is captured. In an exemplary aspect, the 50% reflector can be disposed at 45° relative to the longitudinal axis of the reader. In an alternative aspect, other reflection angles might be useful in specific reader designs and are understood to be within the scope of this disclosure.

FIG. 8C is a schematic cross sectional diagram of the first end 702' of an alternative reader 700'. Reader 700' is an in-line reader wherein the optical path of the light reflecting from the surface of the tag 150 travels in a generally straight path through the microscope optics 730' to the camera module 735' where the image of the tag is captured. Reader 700' may optionally include a light source 770', such as an LED array to adequately illuminate the tag.

Images captured by the reader 700, 700' are relayed to a processor which deciphers the unique codes on the tags. The processor can be located on the printed circuit board 740 of the camera module within the reader or the image information can be transferred to an auxiliary device, such as a laptop computer, a personal digital assistant (PDA), a smart phone or other portable electronic device. The deciphered code information from the tags can then be forwarded to an application that records the codes in a spreadsheet, a database, or another suitable repository. Communications between the reader device, the deciphering processor, and the application can be accomplished through any combination of wired or wireless connections such as USB, Bluetooth, WiFi, etc.

To read an exemplary tag, the first end of the reader is brought into near contact with the tag to be read. The reader's internal software can be designed to recognize when the reader is disposed near the tag such that the tag is in focus enabling the device to automatically collect the image of the desired tag. Optionally, the reader can include an activation button (not shown) that can be pressed to tell the camera when to capture the image of the tag.

Figure 9:
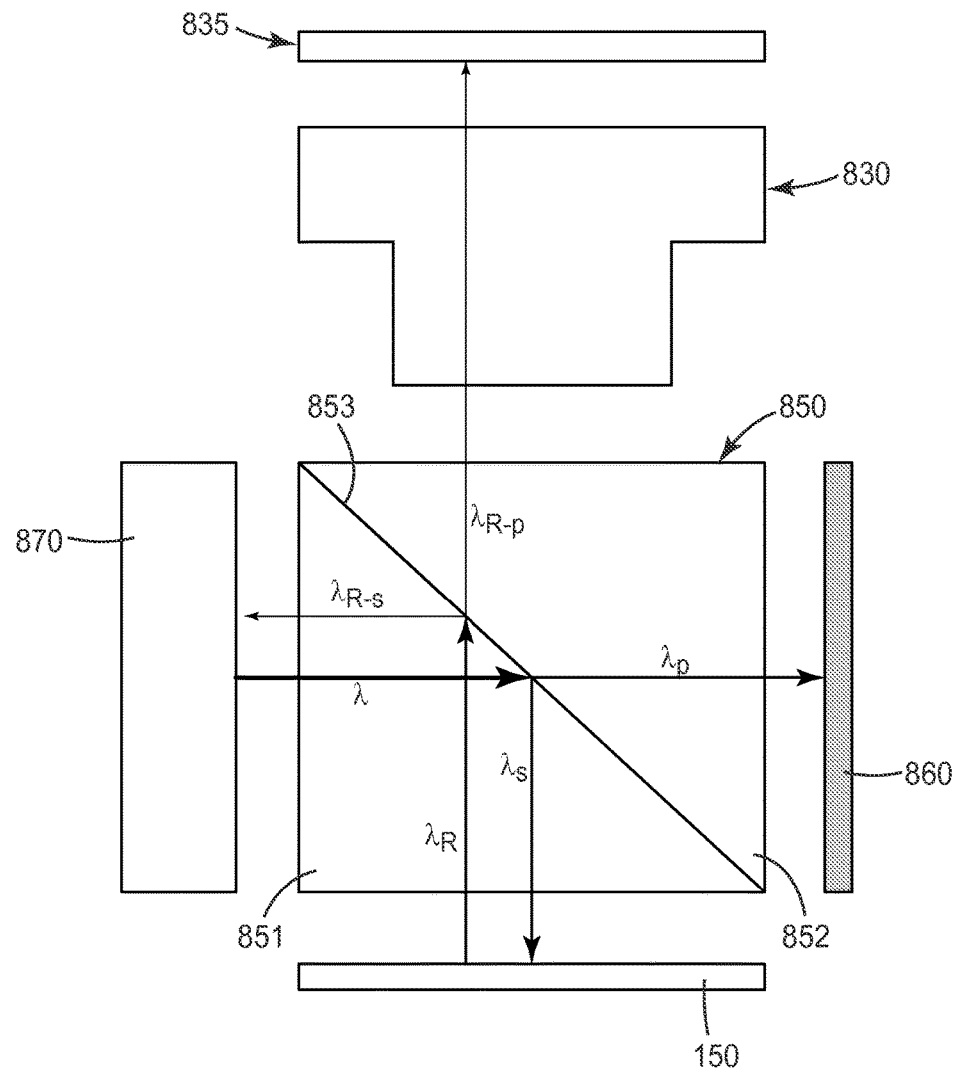
FIG. 9 shows a schematic diagram of an alternative optical arrangement useable in an in-line reading device according to an aspect of the invention.

FIG. 9 shows an alternative optical arrangement useable in an in-line reading device. In the exemplary aspect shown in FIG. 9, the 50% reflector shown in FIG. 8 has been replaced by a polarizing beam splitter 850 and an optional internal light source 870 has been added to the reader. The internal light source in FIG. 9 has been moved away from the microscope optics 830 to minimize the likelihood of undesirable reflections of the light source overwhelming the microscope optics of the camera module. In an exemplary aspect, the polarizing beam splitter can be a conventional glass or quartz design or can be polymeric polarizing beam splitter 850, PCT Publication No. WO 2014/031417, which is hereby incorporated by reference in its entirety.

Polarizing beam splitter 850 includes a first polymeric prism 851, a second polymeric prism 852, and a reflective polarizer 853 disposed between and adhered to a hypotenuse of each of the first and second polymeric prisms. The polarizing beam splitter has a low birefringence such that when polarized light having a first polarization state enters the optical element from the input major surface and travels through at least 2 mm of the polarizing beam splitter and exits the polarizing beam splitter from the output major surface, at least 95% of light exiting the polarizing beam splitter is polarized in the first polarization state.

Polarizing beam splitter 850 is positioned such that it receives light, λ, on an input face from the light source 870. This incident light will generally be of random polarization. Light λ is incident upon reflective polarizer 853 and light of a first polarization, e.g., p-polarized light $\lambda_p$ is transmitted through the reflective polarizer where it impinges on an absorber 860 disposed near the second polymeric prism 852 while light of a second orthogonal polarization, e.g. s-polarized light $\lambda_s$, is reflected toward the target, e.g. tag 150. Light impinging on the tag 150 will partially reflect from the surface, $\lambda_R$. For many exemplary tag materials, reflection from the surface tends to randomize the polarization, even if the input light is substantially polarized. When the light reflected from the tag encounters the reflective polarizer 853, the light is once again resolved into two orthogonal polarizations. The s-polarization, $\lambda_{R-s}$ is reflected back to the light source where it is absorbed. The p-polarization, $\lambda_{R-p}$ is transmitted through the reflective polarizer 853, passes through the microscope optics 830 and is imaged onto the camera module 835.

Figure 10B:
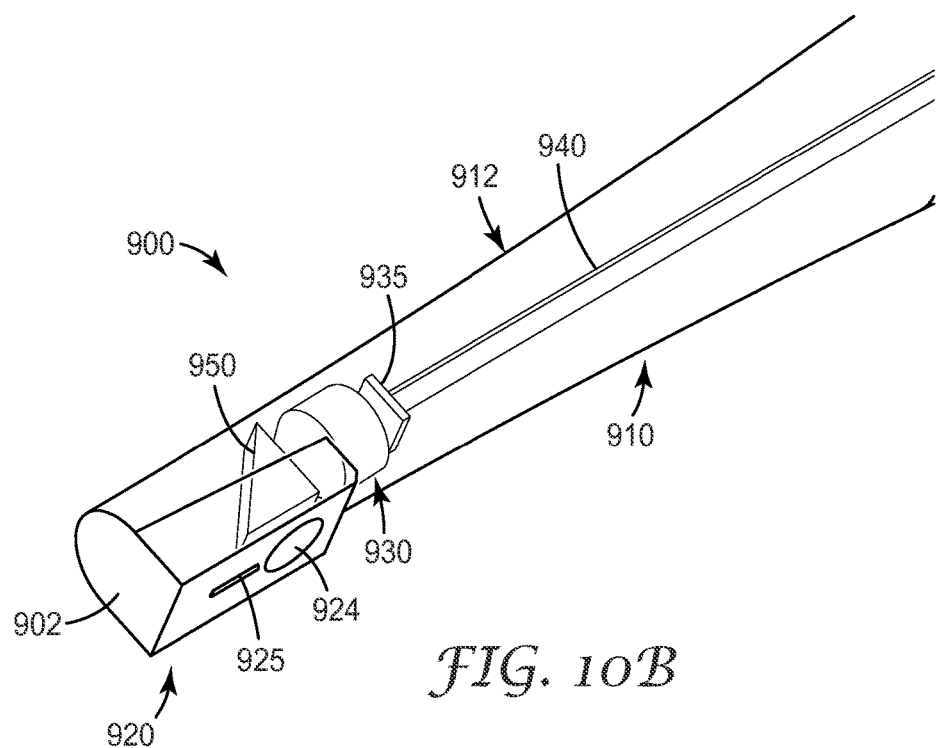
Figure 10C:
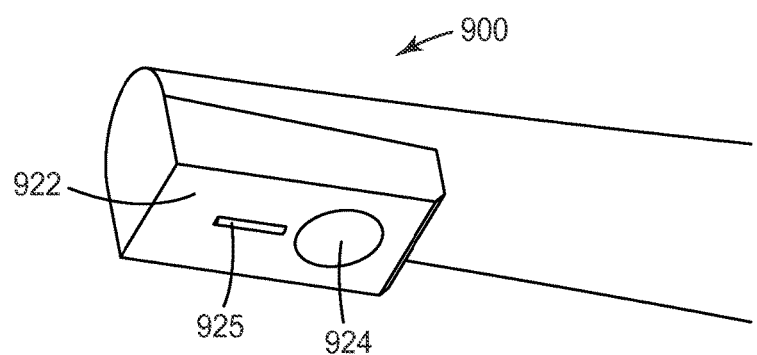

FIGS. 10A-10C show three views of an exemplary reader device 900 that is capable of reading the exemplary tags described in the present disclosure. Because of the small size of the tags, the reader device incorporates folding optics 950, microscope optics 930, a printed circuit board 940, and a camera module 935 into the reader body 910 of the reader device to effectively read the data matrix codes of the unique identifier codes printed on the exemplary tags.

In an exemplary aspect, the reader body 910 can comprise a first body section 912 at a first end 902 of the reader device 900, wherein the first body section holds the optics, electronics and the camera module and a second body section 914 at the second end 904 of the reader device which can hold one or more batteries (not shown) to provide power to the reader. In addition, the exemplary reader device includes a reader head 920 disposed at the first end 902 of reader 900 wherein the reader head is configured to interact with the exemplary tags to be read. In an exemplary aspect, the reader head can have a substantially flat surface 922 configured to rest adjacent to the surface of an exemplary tag while it is being read. The reader head can include features to facilitate proper alignment between the tag(s) and the reader. For example, reader head 920 can include a miniature high strength magnet 925, such as High Strength 1 mm Neodymium Magnets available from McMaster Carr, disposed adjacent to the entrance aperture of the reader head that interacts with a ferromagnetic patch on the exemplary tags, e.g. tags 1000 and 1050 shown in FIGS. 11*a* and 11B. The interaction between Tags 1000, 1050 and exemplary reading device 900 will be described in additional detail below.

In an exemplary aspect, the camera module can be a borescope type camera module. One advantage of borescope type camera modules is their very small size which enables the reader device to be more compact which is exceptionally useful when having to read tags in a very high density patch panel system.

A folding optics 950 can be placed at the entrance aperture 924 of the reader head 920 so that the reader can read the unique identifier codes of tags that are vertically offset and substantially parallel to the axis 908 of reader 900. In the exemplary aspect shown in FIG. 10B, folding optics 950 is a folding mirror or prism. When using the folding mirror (prism) the unique identifier codes can be printed on the tab portions of the tag as a mirror image of the true identifier codes so that they are right reading upon reflection. This feature can also act as an enhanced security feature. Application software for reading two dimensional data codes is now freely available for download onto smart devices. Because of this, it is quite easy to read a two dimensional data code, even in those cases where it is not preferable to give universal access to a code. The exemplary reader device of the present invention uses an explicit mirror image of conventional two-dimensional codes to code information. Reading the information is then accomplished by using an optical reader that inverts the image such as through the use of a folding mirror or prism described above. It should be recognized that in the case of a reader with no folding mirror, the image of the tag could be inverted through software and then interpreted. This simple feature of mirror inverting the data code prevents casual reading of the identifier code by unauthorized individuals.

Figure 10D:
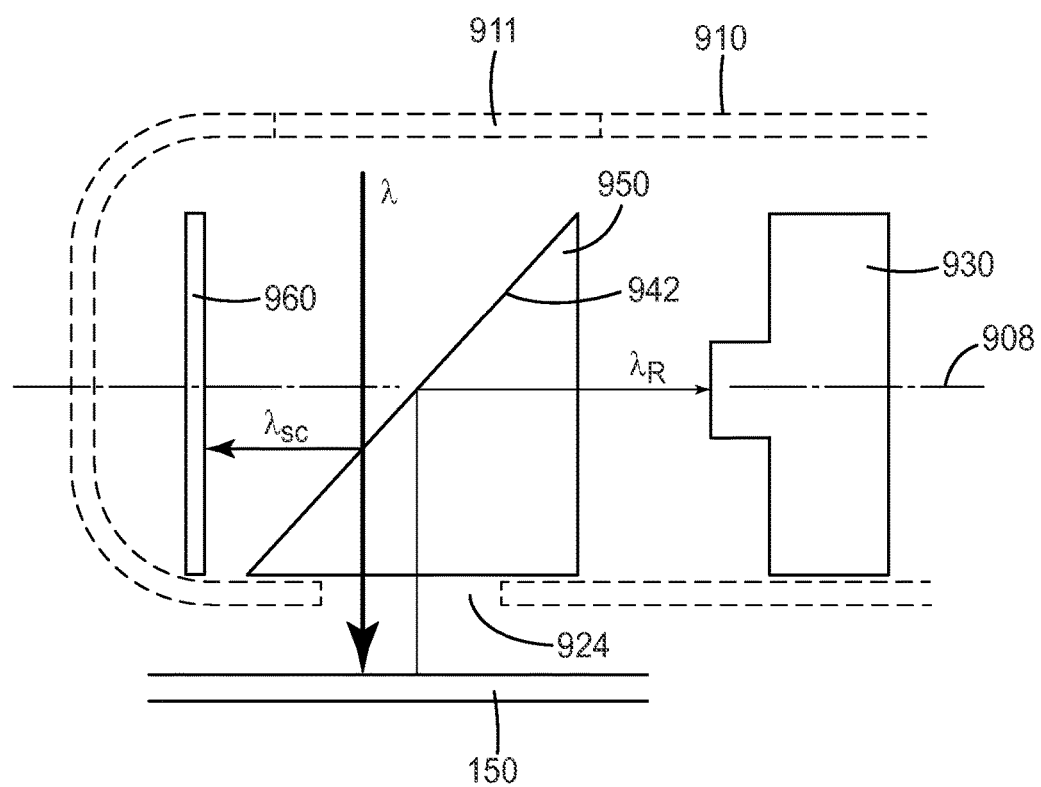

FIG. 10D is a schematic diagram of the optical arrangement used in reader device 900. In this exemplary aspect, direct light, $\lambda$, enters the body of the reader 900 through a transparent window 911 in the side of the reader body 910 and transmits through prism so that the light will impinge on the tag to be read, e.g. tag 150. A small amount of light, $\lambda_{sc}$ will be reflected or scattered off of the angled surface of the prism prior to the direct light, $\lambda$, impinging on the tag. This scattered light can be eliminated by placing an absorber 960 in the appropriate position within the body of the reader so that it will not impact the image quality captured by the reader. Light, $\lambda_R$, reflecting from the surface of the tag travels in a generally straight path until it hits the hypotenuse of the prism which redirects the light orthogonal to its original direction and along the axis of the reader through the microscope optics 930 to the camera module 935 where the image of the tag is captured.

Using folding optics allows the reading of a code that is vertically offset and substantially parallel to the axis of reader device, and the reader device can be slimmer, more ergonomic and easier to use in very high density data center or telecommunication patching installations.

As mentioned previously, accurate registration of a tethered tag to the reader can be accomplished through the use of one or more small high strength magnets incorporated into the reader head in conjunction with a mating patch of ferromagnetic material disposed on the tag.

Figure 11A:
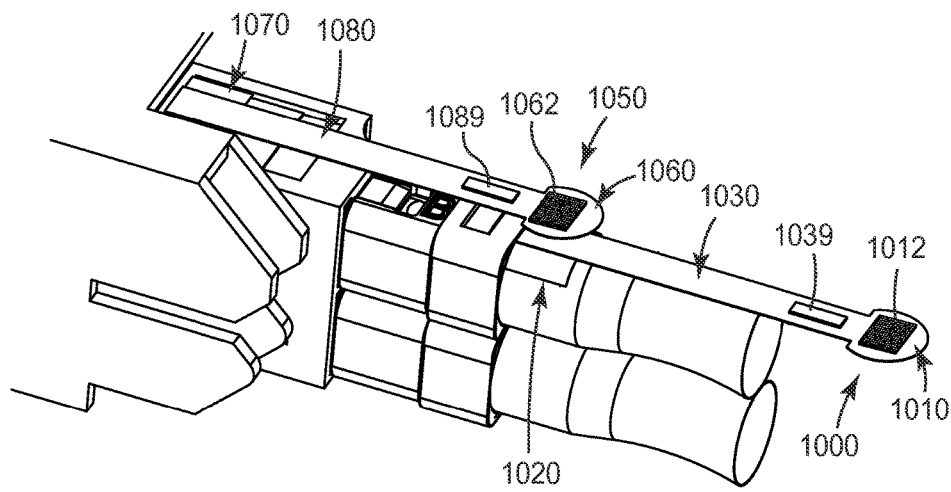
FIGS. 11A and 11B show the interaction between an exemplary tag and the reading device of FIGS. 10A-10C.
Figure 11B:
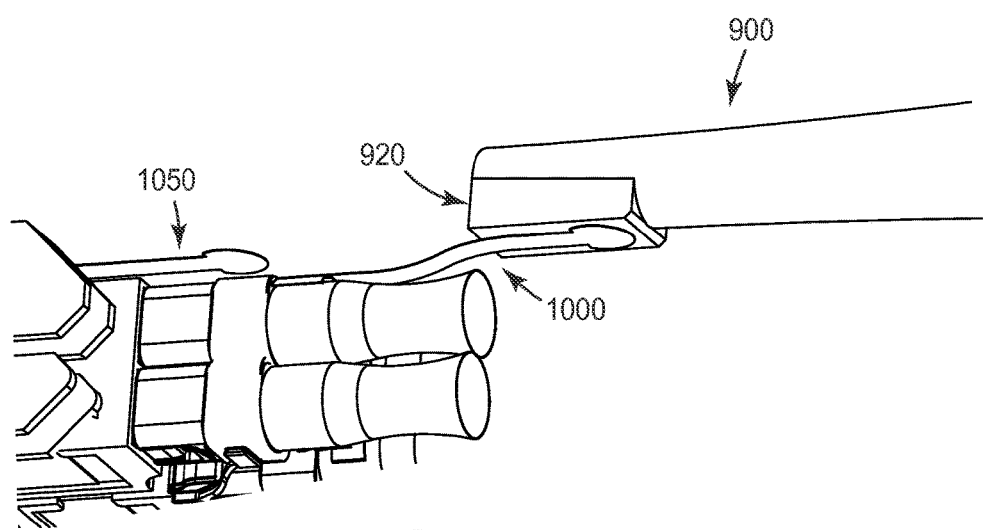

FIGS. 11A and 11B are detailed views of a single LC adapter having exemplary tags 1000, 1050 mounted on the connector boot and the LC adapter, respectively. Each of tags 1000, 1050 include a tab portion 1010, 1060 having a unique identifier 1012, 1062 disposed on at least one side of the tab portion, an anchor portion 1020, 1070 which can be connected to each end of a patch cable/connector or to a jack/adapter disposed in the patch panel as shown in FIG. 11A. Each of the tags 1000, 1050 further includes a flexible tether portion 1030, 1080 that connects the tab portion 1010, 1060 to the anchor portion 1020, 1070 of the tag. Further, each of the tags can include ferromagnetic patch 1039, 1089 disposed on the tether portion 1030, 1080 of the tag which can interact with the high strength magnet(s) on the reader head. In this case, the flexible tether portion 1030, 1080 allows the tag to actively move towards the reader due to the interaction between the ferromagnetic patch on tag and the magnet(s) on the reader head. Thus, when the reader 900 is brought sufficiently close to tag 1000, the magnet(s) on the reader head will attract the ferromagnetic patch on tag aligning the unique identifier code with the entrance aperture on the reader head 920, as shown in FIG. 11B, with good registration accuracy, thus greatly reducing the difficulty of engaging the reader and the tag manually.

In an exemplary aspect, the ferromagnetic patches 1039, 1089 can be made from for example, very thin steel sheet stock that is adhesively bonded to the tether portion of the tags 1000, 1050, respectively. In an alternative aspect, the ferromagnetic patches can be printed or applied to the tag using for example, an ink or paint that has iron filings compounded into it. These types of inks and paints are commercially available, e.g. Rustoleum™ Magnetic Primer. The location of ferromagnetic patches would match that of the magnet in the reader head such that the tag would be oriented into the proper reading location.

FIG. 11B shows the magnet having acted on the tag 1000, clamping the tag against the reader head 920 in the proper registration in order for the tag to be read. Since the operator is not responsible for physically contacting the tags (the magnet does that work) it is no more difficult to employ a tethered tag 1050 on the port/adapter as it is on the patch cable, despite there being less room available to manipulate the reader at the port location. Note that even with the relatively strong magnet, if the reader is pulled straight backwards, the reader slides away from the tag easily disengaging the tag from the reader. This prevents inadvertent disconnection of the connector during reading of the tag.

FIGS. 12A-12D shows an alternative design of an exemplary reading head 1120 of reader device 1100 that employs mechanical means to ensure proper alignment between the unique identifier code on the exemplary tag and the reader. FIG. 12A is an isometric view of the first end 1102 of an exemplary reader 1100 showing reader head 1120. FIG. 12B is a cross section of the exemplary reader head 1120, and FIGS. 12A and 12C show how tag 100' engages with the reader head to read the unique identifier located on the tab portion of tag. FIG. 11D shows how port tag 150 engages with the reader head to read the unique identifier located on the tab portion of the port tag.

Reader head 1120 includes a generally flat base 1122, an entrance aperture 1124 through the base, and a pair of positioning guides 1125 disposed on either side of the entrance aperture to properly position exemplary tag 100' or exemplary port tag 150 so that it can be read by the reader. The positioning guides can include a rail spacer 1126 apart from the base to define a chamfered channel 1127 under the rails and between the positioning guides. The flared shape of tab portion 110' of tag 100 is configured to fit in the chamfered channel to properly align the unique identifier on the tab portion with the entrance aperture of the reader. To mate the tag with exemplary tag 100', the reader head is moved over tag 100' in a direction indicated by directional arrow 1197 until reader can be moved down over the tether portion 130' of the tag as indicated by directional arrow 1198. Once the tether portion of tag 100' slides into the chamfered channel between the positioning guides, the first end of the reader can be moved toward the tab portion of the tag, as indicated by direction arrow 1199, until the flared portion of the tag portion contacts the abutment surfaces 1128 within the chamfered channel preventing further movement of the reader. FIG. 12C shows the tab portion of tag 100 fully engaged with the reader head to allow reading of the unique identifier on the tab portion. Simply reversing the engagement sequence allows disengaging of the tag from the reader. Capturing and reading the tag 100 is facilitated by the flexible tether portion which minimizes the accuracy required for the operator to engage the reader with the tag and also minimizes the likelihood that the connection might be disrupted in the course of reading the tag.

In an exemplary aspect, port tag 150 can have a finite thickness between about 0.5 mm and about 3 mm to allow easy engagement between the port tag with a U-shaped receiving portion 1129 formed by the front ends of the guide rails adjacent to the entrance aperture. In order to read the port tag 150, the reader 1100 would be pushed forward against the port tag so that the port tag resides in U-shaped receiving portion as shown in FIG. 12D. The U-shaped receiving portion allows the port tag stub to be positioned between the positioning guides over the entrance aperture to allow the accurate registration of the port tag to the reader. The different heights of the tag 100' and port tag 150 and their different shapes allow for there to be two discrete registration features (i.e. chamfered channel 1127 and U-shaped receiving portion 1129) formed by the positioning guides at adjacent locations to the entrance aperture on the reader head 1120.

Figure 13A:
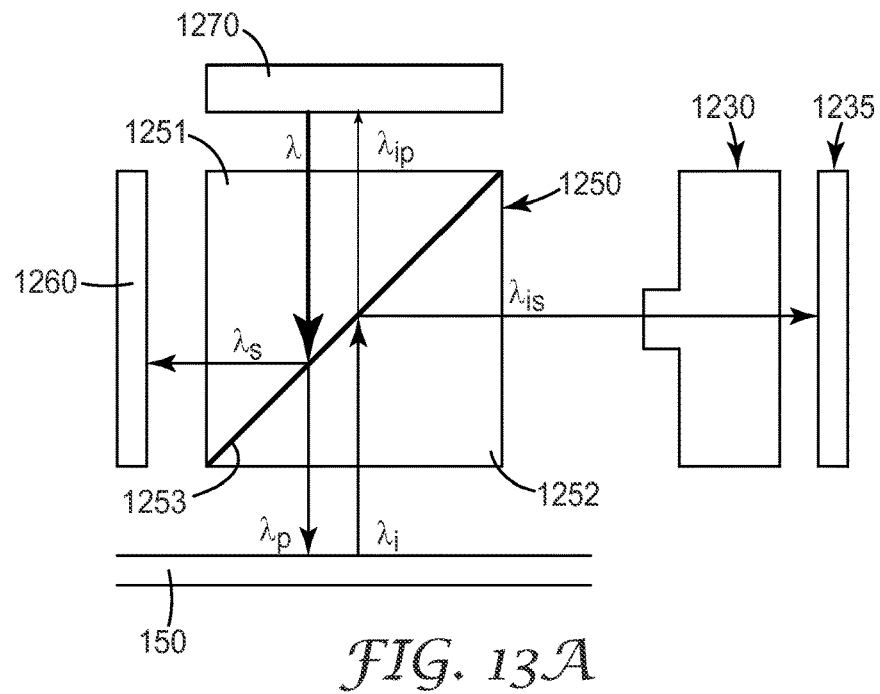
FIGS. 13A and 13B show schematic diagrams of two alternative optical arrangements useable in an off-axis reading device according to an aspect of the invention.
Figure 13B:
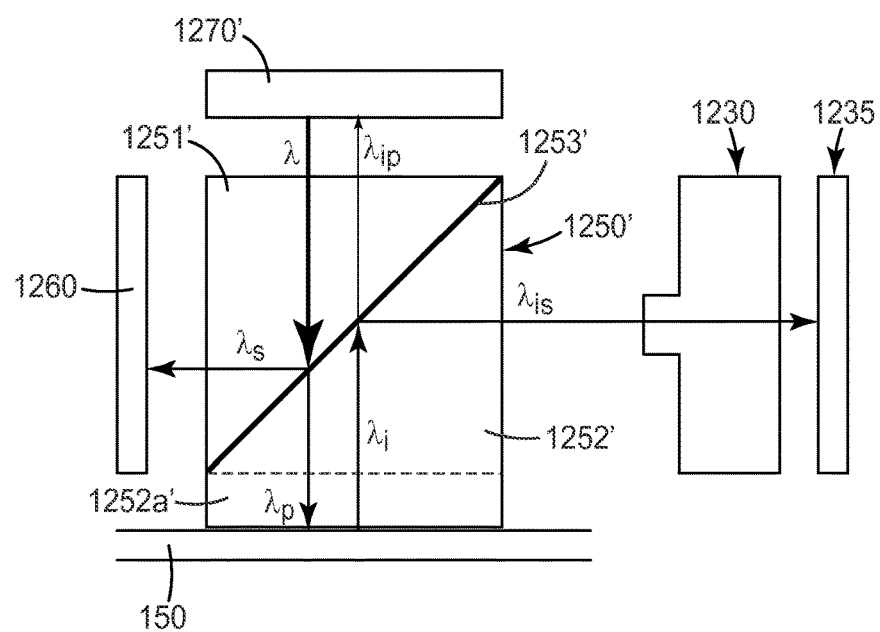

FIGS. 13A and 13B show two similar alternative optical arrangements useable in an off axis reading device similar to device 900 shown in FIGS. 10A and 10B. Comparison of FIGS. 13A and 13B to FIG. 9 also illustrate how the separate components of the device may be distributed around the polarizing beam splitter in a manner that best suits the specific application and the reader design.

In the exemplary aspect shown in FIGS. 13A and 13B, the folding optics of FIGS. 10A, 10B and 10D have been replaced by a polarizing beam splitter. FIG. 13A utilizes a symmetric polarizing beam splitter 1250 while FIG. 13B shows an asymmetric polarizing beam splitter 1250' that can be used when a slightly longer optical length is required. In addition both embodiments shown in 13A and 13B illustrate the use of an optional internal light source in the form of a LED 1270 which can be added to the reader for enhanced image capture. In an exemplary aspect, the polarizing beam splitters 1250, 1250' can be a conventional glass or quartz design or can be polymeric polarizing beam splitter 1250, PCT Publication No. WO 2014/031417, which is hereby incorporated by reference in its entirety.

Symmetric polarizing beam splitter 1250 includes a first polymeric prism 1251, a second polymeric prism 1252, and a reflective polarizer 1253 disposed between and adhered to a hypotenuse of each of the first and second polymeric prisms, wherein the first and second polymeric prisms are symmetric. In contrast, asymmetric polarizing beam splitter 1250' also includes a first polymeric prism 1251', a second polymeric prism 1252', and a reflective polarizer 1253' disposed between and adhered to a hypotenuse of each of the first and second polymeric prisms, however the first and second polymeric prisms are asymmetric. In the exemplary aspect, the second polymeric prism 1252' can have a trapezoidal cross section rather than the triangular cross section shown for the first polymeric prism 1251' shown in FIG. 13B. The trapezoidal shape of the second polymeric prism 1252' includes an extra rectangular base portion 1252a' that can provide additional flexibility in placing the focal plane in the most advantageous location. In an alternative aspect, the first and second prisms reference above can be formed of glass or quartz.

Both polarizing beam splitters 1250 and 1250' should have a low birefringence such that when polarized light having a first polarization state enters the optical element from the input major surface and travels through at least 2 mm of the polarizing beam splitter and exits the polarizing beam splitter from the output major surface, at least 95% of light exiting the polarizing beam splitter is polarized with the first polarization state.

While the shape of the polarizing beam splitters 1250, 1250' are different, their general function and operation are the same and will be described relative to polarizing beam splitter 1250 in FIG. 13A. Polarizing beam splitter 1250 is positioned such that it receives light, $\lambda$, from the light source 1270. This incident light will generally be of random polarization. Light $\lambda$ is incident upon reflective polarizer 1253 and light of one first polarization, e.g., p-polarized light $\lambda_p$ is transmitted through the reflective polarizer where it impinges on the target, e.g. tag 150 while light of a second orthogonal polarization, e.g. s-polarized light $\lambda_s$, is reflected toward a light absorber 1260. Light impinging on the tag 150 will partially reflect from the surface and can be referred to as imaged light, $\lambda_i$. For many exemplary tag materials, reflection from the surface tends to randomize the polarization, even if the input light (i.e. p-polarized light $\lambda_p$) is substantially polarized. When the light reflected from the tag encounters the reflective polarizer 1253, the light is once again resolved into two orthogonal polarizations. The p-polarization component of light $\lambda_p$ is reflected back to the light source where it is absorbed. The s-polarization component of light $\lambda_{is}$ is transmitted through the reflective polarizer 1253, passes through the microscope optics 1230 and is imaged onto the camera module 1235.

One advantage of the readers of the present invention is that the readers have a set focal length that puts the focal plane at the surface of the reader head. The set focal length allows the microscope optics within the reader to be fixed and simplifies the reading of the exemplary tags with the readers of the current invention.

Other advantages of the current registration carrier assembly, tags and installation and reading system can include faster and simpler installation of tags in existing data center because the unique identifiers are preprinted on each tag and because each tags position in the original tag array in the registration carrier assembly is known prior to affixing to the selected mounting locations in a patch panel. Therefore, only one tag needs to be scanned into the database to know the other tags disposed on the same registration carrier assembly. The remaining tags from that registration carrier assembly can be populated into the database automatically based on their known position on the registration carrier assembly relative to the single scanned tag. This advantage can be realized for both the patch cable tags as well as the port tags, and leads to an enormous time savings by eliminating the need to initially scan as many as 90% or more of the remaining tags. This advantage combined with the labor savings achieved when installing the tags provides a very significant reduction in the labor required to retrofit an existing installation with identifier tags. In addition, the small size and geometrically uniform application of the tags creates a more tidy installation so that additional clutter in a dense installation is minimized.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. An identification tag comprising:
   a tab portion having a unique identifier disposed thereon;
   an anchor portion having a permanent adhesive having good adhesion to low energy surfaces disposed thereon to permanently attach the tag to one of a patch cable and a port disposed in a patch panel;
   a tether portion connecting the tab portion to the anchor portion of the tag; and
   a ferromagnetic patch disposed on the tether portion of the tag.

2. The tag of claim 1, wherein the tab portion, anchor portion and the tether portion of the tag are formed as an integral structure that is cut from one of a polymer stock material, a nonwoven stock material and a paper based stock material.

3. The tag of claim 1, wherein permanent adhesive having good adhesion to low energy surfaces is applied onto the anchor portion on a side opposite the unique identifier.

4. The tag of claim 1, wherein permanent adhesive having good adhesion to low energy surfaces is applied onto the anchor portion on a same side as the unique identifier.

5. The tag of claim 1, wherein the anchor portion is an adhesive tape segment that is disposed over and extending laterally away from the tether portion.

6. The tag of claim 5, wherein the adhesive tape segment comprises a permanent adhesive having good adhesion to plastic surfaces disposed on one side of a robust backing material.

7. The tag of claim 1, wherein the unique identifier is a two-dimensional code.

8. The tag of claim 1, wherein the unique identifier is one of a one-dimensional bar code, a two-dimensional bar code and a quick response code.

9. The tag of claim 1, wherein the unique identifier is printed on the tab portion as an inverted image of a two-dimensional code to provide improved network security.

10. The tag of claim 1, further comprising a clear separate substrate material laminated over the unique identifier disposed on the tab portion of the tag to protect the unique identifier from wear and abrasion.

11. An identification tag comprising:
    a tab portion having a unique identifier disposed thereon;
    an anchor portion to attach the tag to one of a patch cable and a port disposed in a patch panel;
    a tether portion connecting the tab portion to the anchor portion of the tag; and
    a ferromagnetic patch disposed on the tether portion of the tag.

12. The tag of claim 11, further comprising a permanent adhesive having good adhesion to low energy surfaces applied onto the anchor portion on a side opposite the unique identifier to permanently attach the identification tag to one of the patch cable and the port.

13. The tag of claim 11, further comprising permanent adhesive having good adhesion to low energy surfaces is applied onto the anchor portion on a same side as the unique identifier to permanently attach the identification tag to one of the patch cable and the port.

14. The tag of claim 11, wherein the unique identifier is one of a two-dimensional code, a one-dimensional bar code, a two-dimensional bar code and a quick response code.

15. The tag of claim 11, wherein the unique identifier is printed on the tab portion as an inverted image of a two-dimensional code to provide improved network security.

16. The tag of claim 11, further comprising a clear separate substrate material laminated over the unique identifier disposed on the tab portion of the tag to protect the unique identifier from wear and abrasion.

* * * * *